(12) United States Patent
Uchimura et al.

(10) Patent No.: US 12,253,629 B2
(45) Date of Patent: Mar. 18, 2025

(54) SENSOR DEVICE AND ARTICLE DISPLAY SHELF

(71) Applicants: NEC Corporation, Tokyo (JP); NEC Platforms, Ltd., Kawasaki (JP)

(72) Inventors: Jun Uchimura, Tokyo (JP); Hiroshi Takahashi, Kanagawa (JP)

(73) Assignees: NEC CORPORATION, Tokyo (JP); NEC Platforms, Ltd., Kanagawa (JP)

( * ) Notice: Subject to any disclaimer, the term of this patent is extended or adjusted under 35 U.S.C. 154(b) by 1003 days.

(21) Appl. No.: 17/287,043

(22) PCT Filed: Oct. 23, 2019

(86) PCT No.: PCT/JP2019/041576
§ 371 (c)(1),
(2) Date: Apr. 20, 2021

(87) PCT Pub. No.: WO2020/090592
PCT Pub. Date: May 7, 2020

(65) Prior Publication Data
US 2021/0382145 A1 Dec. 9, 2021

(30) Foreign Application Priority Data
Oct. 29, 2018 (JP) ................. 2018-202825

(51) Int. Cl.
| | | |
|---|---|---|
| *G01S 7/48* | (2006.01) | |
| *A47F 3/00* | (2006.01) | |
| *A47F 5/00* | (2006.01) | |
| *G01S 7/481* | (2006.01) | |
| *G01S 17/88* | (2006.01) | |
| *G02B 26/12* | (2006.01) | |

(52) U.S. Cl.
CPC ............ *G01S 7/4811* (2013.01); *A47F 3/001* (2013.01); *A47F 5/0018* (2013.01); *G01S 17/88* (2013.01); *G02B 26/126* (2013.01)

(58) Field of Classification Search
USPC ........................................ 356/4.01
See application file for complete search history.

(56) References Cited

U.S. PATENT DOCUMENTS 10,031,213 B2 * 7/2018 Mushimoto ........... G01S 7/4812
2005/0254101 A1 11/2005 Chen
(Continued)

FOREIGN PATENT DOCUMENTS

| JP | H03-129314 A | 6/1991 |
|---|---|---|
| JP | H10-082851 A | 3/1998 |

(Continued)

OTHER PUBLICATIONS

International Search Report for PCT Application No. PCT/JP2019/041576, mailed on Jan. 7, 2020.
(Continued)

*Primary Examiner* — James R Hulka

(57) ABSTRACT

Provided is a sensor device including: a sensor device including: a sensor unit that emits light and receives light reflected by an object; and a reflection mirror unit that reflects light emitted from the sensor unit. A reflection surface of a reflection mirror included in the reflection mirror unit includes a first part and a second part having lower reflectance than the first part.

8 Claims, 23 Drawing Sheets

(56) References Cited

U.S. PATENT DOCUMENTS

| | | | |
|---|---|---|---|
| 2010/0019906 A1 | 1/2010 | Kushida et al. | |
| 2010/0272320 A1 | 10/2010 | Doittau et al. | |
| 2012/0242974 A1 | 9/2012 | Lavalley et al. | |
| 2015/0055117 A1 | 2/2015 | Pennecot et al. | |
| 2016/0011311 A1* | 1/2016 | Mushimoto | G06K 7/10831 |
| | | | 250/236 |

FOREIGN PATENT DOCUMENTS

| | | |
|---|---|---|
| JP | H10-325725 A | 12/1998 |
| JP | 2001-012943 A | 1/2001 |
| JP | 2004-093504 A | 3/2004 |
| JP | 2007-328668 A | 12/2007 |
| JP | 2009-531674 A | 9/2009 |
| JP | 2010-006557 A | 1/2010 |
| JP | 2011-507044 A | 3/2011 |
| JP | 2012-068177 A | 4/2012 |
| JP | 2012-198209 A | 10/2012 |
| JP | 2016-020834 A | 2/2016 |
| JP | 2016-534346 A | 11/2016 |

OTHER PUBLICATIONS

English translation of Written opinion for PCT Application No. PCT/JP2019/041576, mailed on Jan. 7, 2020.
JP Office Action for JP Application No. 2020-553820, mailed on Sep. 21, 2023 with English Translation.

\* cited by examiner

SENSOR DEVICE AND ARTICLE DISPLAY SHELF

This application is a National Stage Entry of PCT/JP2019/041576 filed on Oct. 23, 2019, which claims priority from Japanese Patent Application 2018-202825 filed on Oct. 29, 2018, the contents of all of which are incorporated herein by reference, in their entirety.

TECHNICAL FIELD

The present invention relates to a sensor device and an article display shelf.

BACKGROUND ART

Patent Literature 1 discloses a LiDAR (Light Detection and Ranging) device including a transmission block and a light receiving block in a housing. The transmission block includes a light source for emitting light, and the light receiving block includes a detector for detecting light. The housing is rotatably configured, and a reflection surface for reflecting light is provided in the housing. With the above-described configuration, the LiDAR device can perform three-dimensional measurement of the surrounding environment.

CITATION LIST

Patent Literature

PTL 1: Japanese Patent Application Laid-open No. 2016-534346

SUMMARY OF INVENTION

Technical Problem

In the sensor device including a LiDAR device as described in Patent Literature 1, further improvement in detection accuracy may be required depending on the application.

The present invention has been made in view of the problems described above and intends to provide a sensor device with improved detection accuracy and an article display shelf provided with the sensor device.

Solution to Problem

According to one example aspect of the present invention, provided is a sensor device including: a sensor unit that emits light and receives light reflected by an object; and a reflection mirror unit that reflects light emitted from the sensor unit. A reflection surface of a reflection mirror included in the reflection mirror unit includes a first part and a second part having lower reflectance than the first part.

Advantageous Effects of Invention

According to the present invention, a sensor device with improved detection accuracy and an article display shelf provided with the sensor device can be provided.

DESCRIPTION OF EMBODIMENTS

Example embodiments of the present invention will be described below with reference to the drawings. Throughout the drawings, the same components or corresponding components are labeled with same references, and the description thereof may be omitted or simplified.

First Example Embodiment

Figure 1:
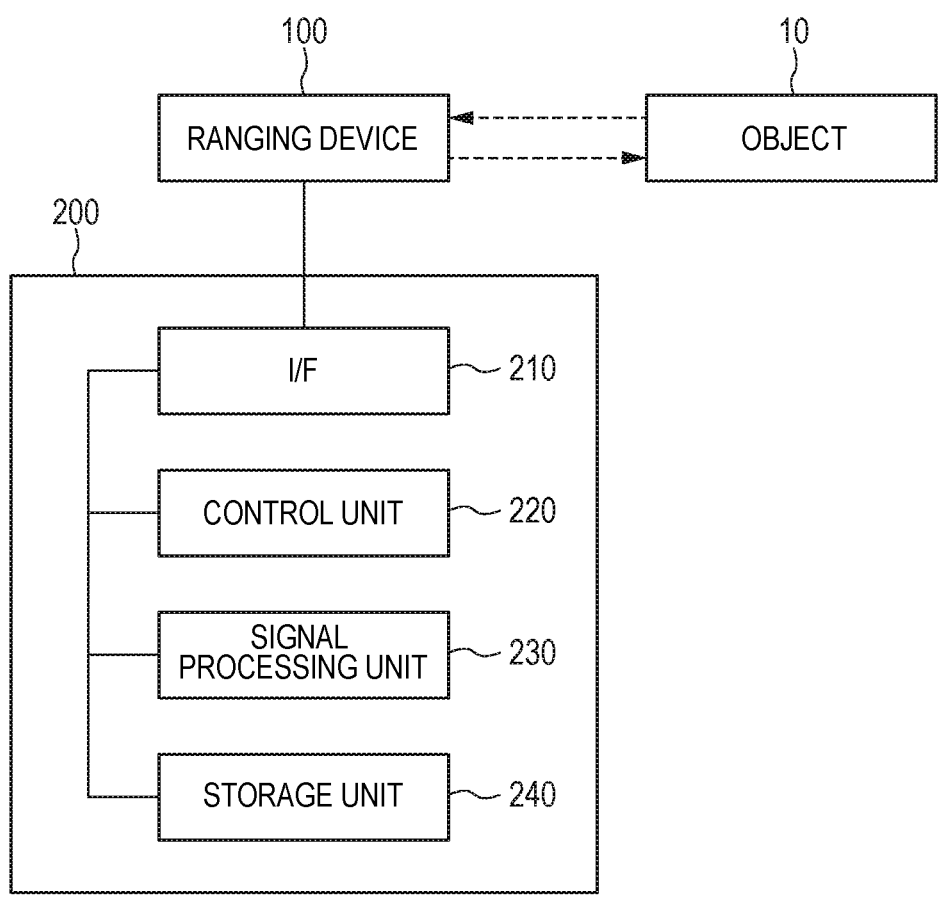
FIG. 1 is a schematic diagram illustrating a general configuration of an object detection system including a ranging device according to a first example embodiment.

FIG. 1 is a schematic diagram illustrating a general configuration of an object detection system including a ranging device 100 according to the first example embodiment. The object detection system includes a ranging device 100 and a control device 200.

The ranging device 100 is a device such as a LiDAR device, for example. The ranging device 100 can acquire a distribution of the distance from the ranging device 100 by emitting a light in a predetermined range and detecting a reflection light from an object 10. The ranging device 100 may be referred to as a sensor device in a more general sense. Although FIG. 1 illustrates a single ranging device 100, the object detection system may be configured to include a plurality of ranging devices 100. Note that, in the present specification, light is not limited to visible light but may include invisible light that cannot be viewed by a naked eye, such as an infrared ray, an ultraviolet ray, or the like.

The control device 200 is a computer, for example. The control device 200 has an interface (I/F) 210, a control unit 220, a signal processing unit 230, and a storage unit 240. The interface 210 is a device that connects the control device 200 and the ranging device 100 so as to be able to communicate with each other in a wired or wireless manner. Thereby, the control device 200 and the ranging device 100 are communicably connected to each other. The interface 210 may be a communication device based on the specification such as Ethernet (registered trademark), for example. The interface 210 may include a repeater device such as a switching hub. When the object detection system has a plurality of ranging devices 100, the control device 200 can control the plurality of ranging devices 100 by relaying via a switching hub or the like.

The control unit 220 controls the operation of the ranging device 100. The signal processing unit 230 acquires distance information on an object 10 inside a detection range by processing a signal acquired from the ranging device 100. The function of the control unit 220 and the signal processing unit 230 may be implemented when a processor such as a central processing unit (CPU) or the like provided in the control device 200 reads a program from a storage device and executes the program, for example. The storage unit 240 is a storage device that stores data acquired by the ranging device 100, a program and data used in the operation of the control device 200, or the like. Accordingly, the control device 200 has a function of controlling the ranging device 100 and a function of analyzing a signal acquired by the ranging device 100.

The configuration of the object detection system described above is an example, and the object detection system may further include a device that collectively controls the ranging device 100 and the control device 200. Further, the object detection system may be an integrated device in which the function of the control device 200 is incorporated in the ranging device 100.

Figure 2:
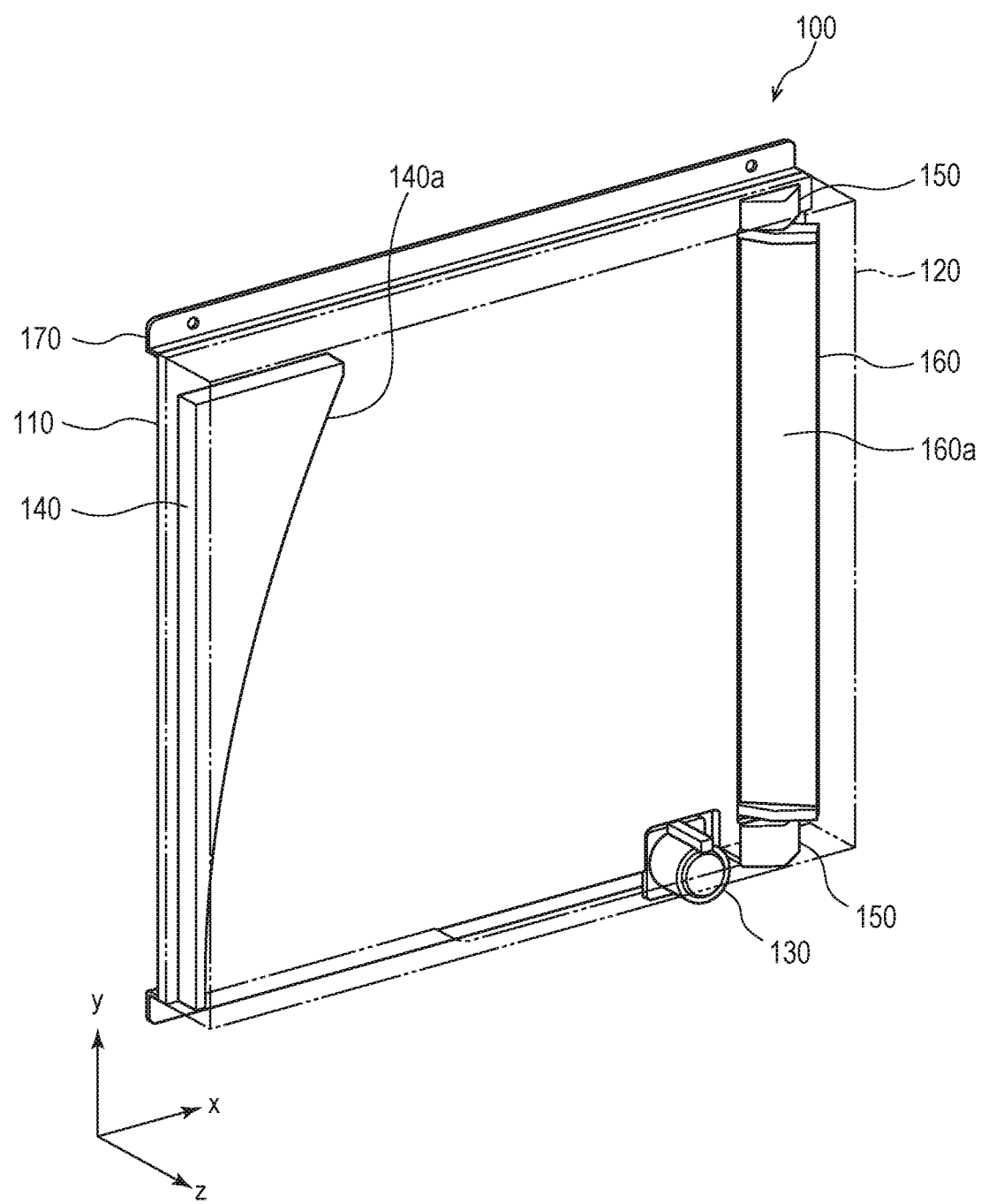
FIG. 2 is a schematic perspective view illustrating the structure of the ranging device according to the first example embodiment.
Figure 3:
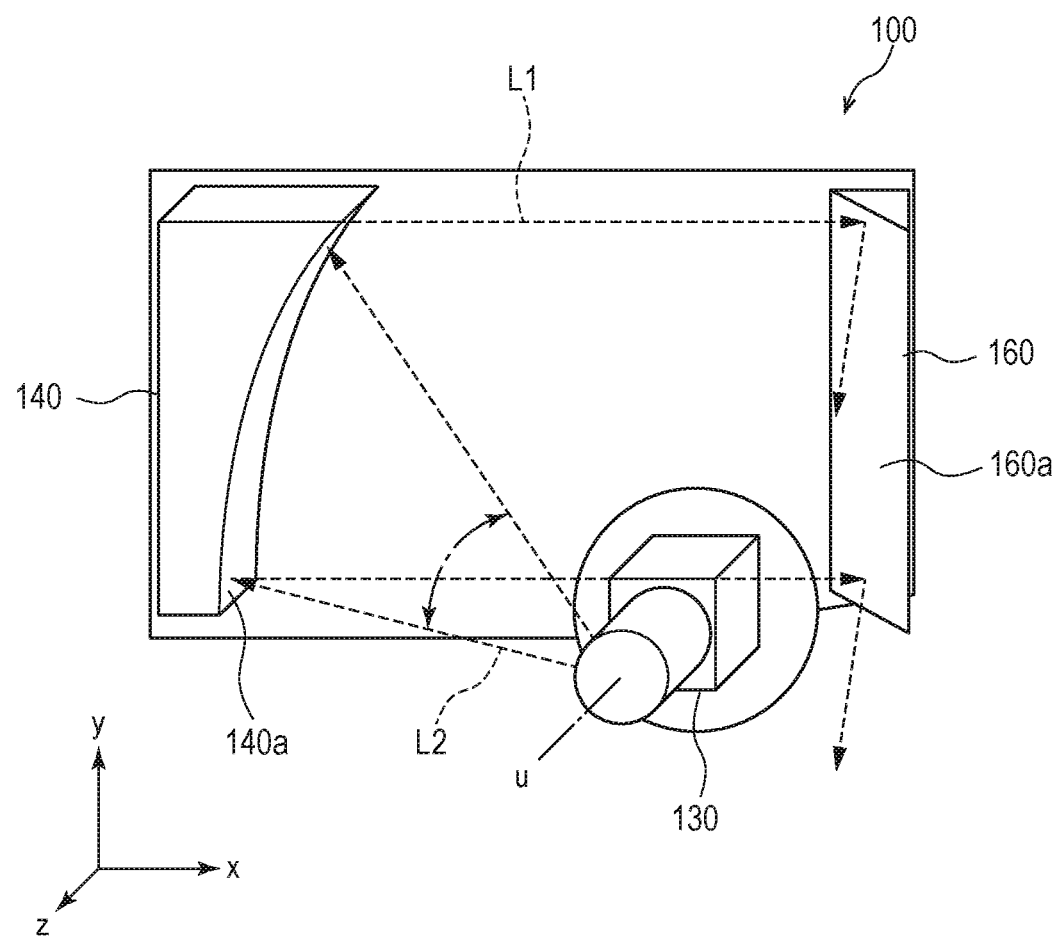
FIG. 3 is a schematic front view illustrating the structure of the ranging device according to the first example embodiment.
Figure 4:
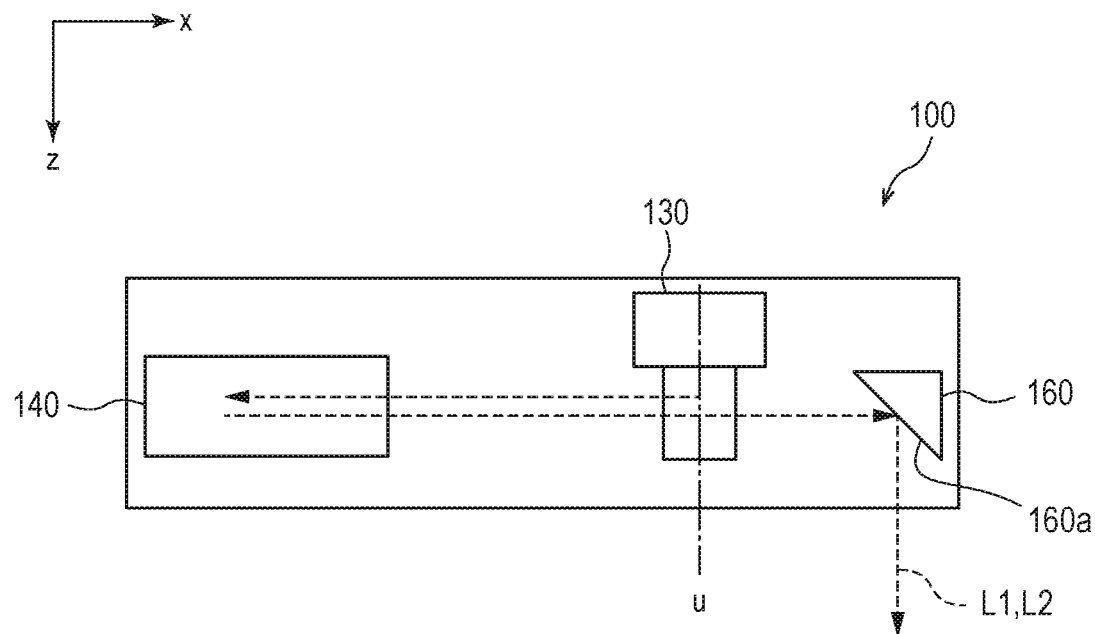
FIG. 4 is a schematic top view illustrating the structure of the ranging device according to the first example embodiment.

FIG. 2 is a schematic perspective view illustrating the structure of the ranging device 100 according to the first example embodiment. FIG. 3 illustrates the structure of the ranging device 100 viewed from the front. FIG. 4 illustrates the structure of the ranging device 100 viewed from the top. The structure of the ranging device 100 will be described with reference to these figures. Note that, the x-axis, the y-axis, and the z-axis illustrated in each drawing are solely provided for helping the description and are not intended to limit the arrangement direction of the ranging device 100.

As illustrated in FIG. 2, the ranging device 100 includes a base body 110, a lid body 120, a sensor unit 130, a parabolic reflection mirror 140, a position adjustment mechanism 150, and a plane reflection mirror 160, and a mounting portion 170. Note that, the plurality of reflection mirrors included in the ranging device 100 (in this example, the parabolic reflection mirror 140 and the plane reflection mirror 160) may be collectively called a reflection mirror unit.

The base body 110 is a member shaped in a rectangular plate and functions as a part of the housing of the ranging device 100. The base body 110 has a function of fixing the sensor unit 130, the parabolic reflection mirror 140, the plane reflection mirror 160 or the like at a predetermined position.

The lid body 120 is a lid covering the base body 110, and functions as a part of the housing of the ranging device 100. In the internal space of the housing surrounded by the base body 110 and the lid body 120, the parabolic reflection mirror 140, the position adjustment mechanism 150, and the plane reflection mirror 160 are arranged.

The sensor unit 130 is a two-dimensional LiDAR device. As illustrated in FIG. 3, the sensor unit 130 can perform rotational scan about the rotation axis u. The sensor unit 130 includes a laser device for emitting laser light, and a photoelectric conversion element for receiving the reflection light reflected by the object 10 and converting it into an electric signal. As illustrated in FIG. 2, the sensor unit 130 is arranged in a notch formed below the base body 110 and the lid body 120. The light emitted from the sensor unit 130 is incident on the reflection surface 140a of the parabolic reflection mirror 140.

As an example of a distance detection scheme performed by the sensor unit 130, a TOF (Time Of Flight) scheme may be used. The TOF scheme is a method for measuring a distance by measuring a period from emission of a light to reception of a reflected light.

Note that, the laser light emitted from the sensor unit 130 may be visible light but may be invisible light such as an infrared ray. In a use of detection of an article being put in or taken out from an article display shelf described later or the like, it is desirable that the emission light be invisible light so as not to give discomfort to a user. The laser light may be an infrared ray having a wavelength of around 905 nm, for example.

The parabolic reflection mirror 140 is a reflection mirror having a reflection surface 140a. The reflection surface 140a forms a parabola with a point on the rotation axis u as a focal point in a section (xy plane in FIG. 3) perpendicular to the rotation axis u. In other words, the sensor unit 130 is arranged near the focal point of the parabola formed by the reflection surface 140a, and the rotation axis u is arranged at a position passing through the focal point of the parabola formed by the reflection surface 140a. The rotation axis u is parallel to the z-axis in FIG. 3. The equation of the parabola is expressed by the following equation (1) when the coordinate of the vertex of the parabola is P(0, 0) and the coordinate of the focal point is F(a, 0).

[Math. 1]

$$y^2 = 4ax \quad (1)$$

Due to the mathematical nature of the parabola, when light emitted from the sensor unit 130 is reflected by the reflection surface 140a, the direction of emission of the reflection light is parallel to the axis of the parabola regardless of the angle of the emission light. That is, as illustrated in FIG. 3, in the optical path L1 and the optical path L2 having different emission angles from the sensor unit 130, reflected light by the reflection surface 140a is parallel to each other. In this manner, by arranging the sensor unit 130 at the focal point of the reflection surface 140a, parallel scan in which the optical path is moved in parallel in the y-axis direction in accordance with the rotation of the emission light can be performed.

The material of the parabolic reflection mirror 140 may be, for example, an aluminum alloy mainly composed of aluminum. In this case, the reflection surface 140a may be formed, for example, by smoothing the surface of an aluminum alloy by mirror polishing or plating. Noted that, other parabolic reflection mirrors described later may be formed of the same material and method.

The plane reflection mirror 160 is a reflection mirror having a reflection surface 160a at least partially forming a plane. The reflection surface 160a is provided on the optical path of the reflection light on the reflection surface 140a. As illustrated in FIG. 3 and FIG. 4, the plane reflection mirror 160 changes a direction of the light reflected by the reflection surface 140a to a direction different from that in the xy plane. More specifically, the light reflected by the plane reflection mirror 160 is almost in the z-axis direction, that is, in a direction almost parallel to the rotation axis u. The light reflected by the plane reflection mirror 160 is emitted to the outside of the ranging device. Thus, the direction of the light emitted from the ranging device 100 is not limited to the direction parallel to the axis of the reflection surface 140a.

The material of the plane reflection mirror 160 may also be, for example, an aluminum alloy mainly composed of aluminum, as the parabolic reflection mirror 140. In this case, the reflection surface 160a of the plane reflection mirror 160 may be formed by the same smoothing as the reflection surface 140a, or may be formed by sticking a plate of an aluminum alloy having a specular gloss to a base member. Noted that, other plane reflection mirrors described later may be formed of the same material and method.

A more detailed configuration of the reflection surface 140a and 160a will be described later.

Here, the lid body 120 is configured so as not to absorb, reflect, or the like reflection light from the plane reflection mirror 160. Specifically, for example, a region of the lid body 120 through which reflected light from the plane reflection mirror 160 passes may be formed of a material having transparency. Example of a material having transparency includes acrylic resins. Alternatively, a window may be provided in the lid body 120 so as to form a cavity in a region through which reflected light from the plane reflection mirror 160 passes.

The mounting portion 170 is a part for mounting and fixing the ranging device 100 to an article display shelf or the like. By being fixed by the mounting portion 170, the ranging device 100 can be mounted in any direction. The position adjustment mechanism 150 is a mechanism for finely adjusting the position of the plane reflection mirror 160 when the ranging device 100 is mounted to an article display shelf or the like. Note that, instead of the position adjustment mechanism 150, a drive mechanism for moving the plane reflection mirror 160 may be provided.

The optical paths L1 and L2 illustrated in FIG. 3 and FIG. 4 illustrate optical paths when light is emitted from the sensor unit 130 to the outside. On the other hand, the light reflected by the object 10 and incident on the ranging device 100 passes in the reverse direction along almost the same path as the optical paths L1 and L2 and is received by the sensor unit 130.

The ranging device 100 of the present example embodiment has a structure that is thick in the axial direction of the parabolic reflection mirror 140 due to the thickness of the parabolic reflection mirror 140, restrictions on the arrangement position of the sensor unit 130, or the like. On the other hand, the ranging device 100 of the present example embodiment includes the plane reflection mirror 160 for reflecting the light reflected by the parabolic reflection mirror 140. The plane reflection mirror 160 can change a direction of the emission light from the ranging device 100 to a direction different from the direction of the axis of the parabola formed by the parabolic reflection mirror. Therefore, in the ranging device 100 of the present example embodiment, since the light emission direction can be made different from the axial direction of the parabolic reflection mirror 140, the thickness in the light emission direction can be reduced. Thus, the ranging device 100 of the present example embodiment can be easily installed in a narrow place such as between article display shelves. Therefore, according to the present example embodiment, the ranging device 100 is provided in which the degree of freedom of the installation location is improved.

In the ranging device 100 of the present example embodiment, the reflection surface 140a of the parabolic reflection mirror 140 is provided so as to exclude the vertex of the parabola. The reason for this configuration will be described with reference to FIGS. 5 to 7.

Figure 5:
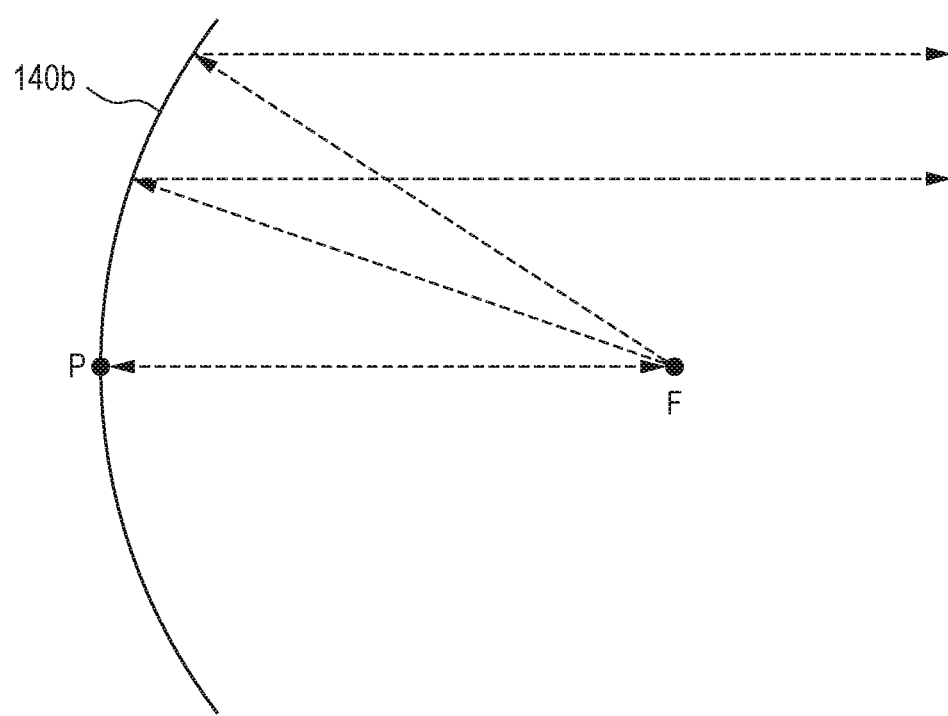
FIG. 5 is an optical path diagram in the case where a reflection surface is provided at the vertex of the parabola.

FIG. 5 is an optical path diagram in the case where the reflection surface 140b is provided at the vertex P of the parabola. For simplicity of explanation, the sensor unit 130 is simply illustrated as a point light source arranged at the focal point F of the reflection surface 140b. If the light emitted from the focal point F is not parallel to the axis of the parabola (if not oriented to vertex P), the reflection light does not pass through the focal point F. However, if the light emitted from the focal point F is parallel to the axis of the parabola (direction towards vertex P) and is reflected at the vertex P, the reflection light passes through the focal point F. Therefore, the light emitted from the sensor unit 130 is re-incident on the sensor unit 130. In this case, when the sensor unit 130 receives reflection light different from the reflection light from the object 10, noise may be generated for the measured signal. As described above, when the reflection surface 140b is provided at the vertex P of the parabola, the detection accuracy may be lowered, and sufficient detection accuracy may not be secured.

Figure 6:
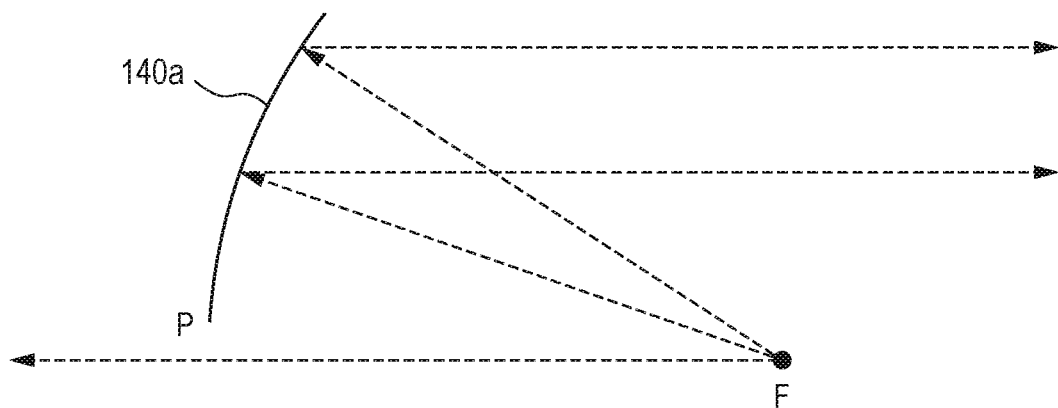
FIG. 6 is an optical path diagram in the case where the reflection surface is not provided at the vertex of the parabola.

In contrast, in the ranging device 100 of the present example embodiment, as illustrated in FIG. 6, the reflection surface 140a is provided so as to exclude the vertex P of the parabola. Therefore, even if the light emitted from the focal point F is parallel to the axis of the parabola, it is not reflected. Therefore, since the reflection light does not re-enter the sensor unit 130, the reduction of the detection accuracy can be suppressed. As described above, according to the present example embodiment, since the reflection surface 140a of the parabolic reflection mirror 140 is provided so as to exclude the vertex of the parabola, the ranging device 100 having improved detection accuracy is provided.

Figure 7:
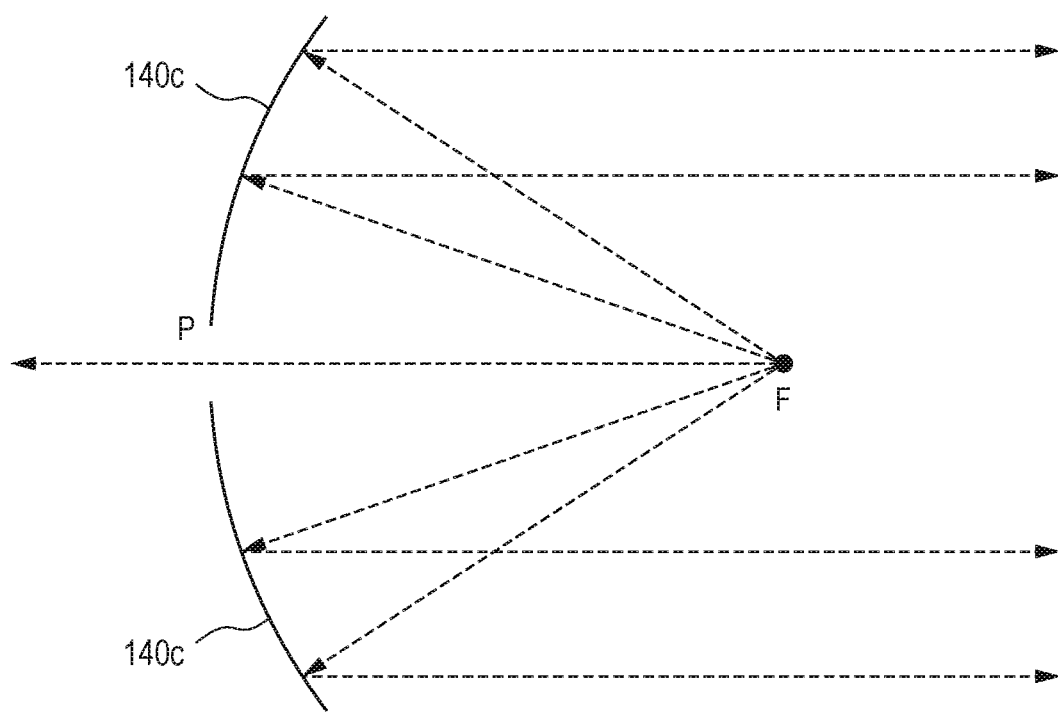
FIG. 7 is an optical path diagram in the case where the reflection surface is not provided at the vertex of the parabola.

Note that, in FIG. 6, the reflection surface 140a is arranged on one side of the axis of the parabola, but as in the modification illustrated in FIG. 7, the reflection surface 140c may be arranged on both sides except for the vertex P of the parabola. A specific configuration example corresponding to this modification will be described later.

Figure 8:
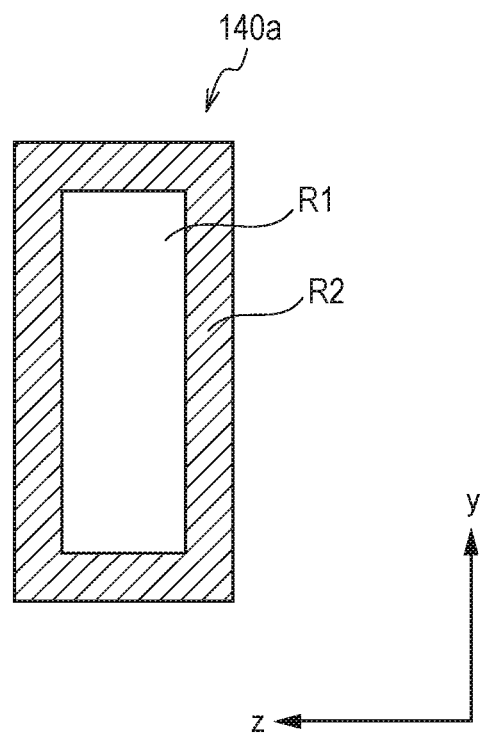
FIG. 8 is a schematic diagram illustrating a configuration example of the reflection surface according to the first example embodiment.
Figure 9:
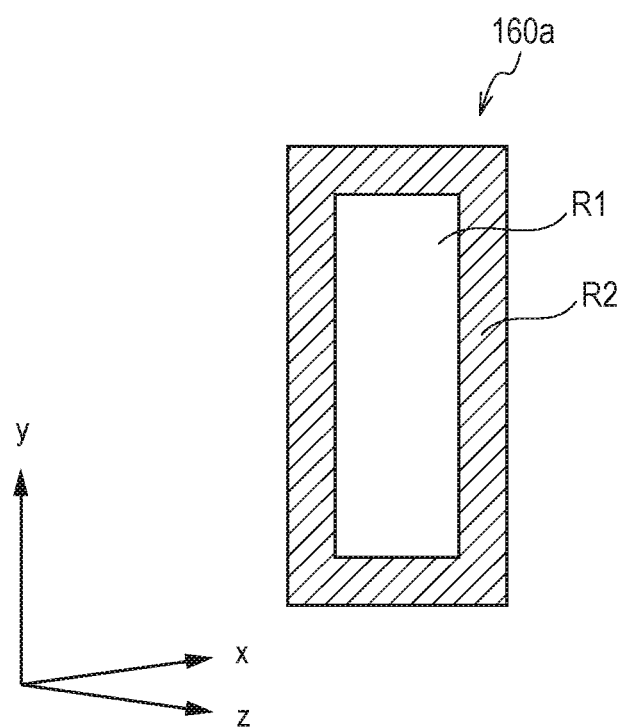
FIG. 9 is a schematic diagram illustrating a configuration example of the reflection surface according to the first example embodiment.

With reference to FIG. 8 and FIG. 9, a more specific configuration example of the reflection surface 140a and 160a will be described. FIG. 8 is a schematic diagram illustrating a configuration example of the reflection surface 140a, and FIG. 9 is a schematic diagram illustrating a configuration example of the reflection surface 160a. Note that, the same configuration as that of the reflection surface 140a of FIG. 8 can be applied to the reflection surface 140b illustrated in FIG. 5 and the reflection surface 140c illustrated in FIG. 7.

FIG. 8 is a diagram of the reflection surface 140a viewed from the negative direction of the x-axis. The reflection surface 140a includes a first part R1 and a second part R2. The reflectance of the light of the second part R2 is less than that of the light of the first part R1. In other words, the light absorptance of the second part R2 is greater than that of the first part R1. Note that, in the case where the reflectance of the reflection surface 140a shows wavelength dependence, the "reflectance" here means the reflectance at the wavelength of light emitted from and detected by the sensor unit 130, that is, light used for sensing. The same applies to the absorptance. For example, when the laser beam emitted from the sensor unit 130 is an infrared ray having a wavelength of 905 nm, the above-described "reflectance" is assumed to be a reflectance with respect to an infrared ray having a wavelength of 905 nm.

The light emitted from the sensor unit 130 and the light detected by the sensor unit 130 pass through the same optical path in the opposite direction. Therefore, structures outside the optical path, such as outside the scan range in the reflection surface 140a, ideally do not affect detection accuracy. However, the light flux emitted from the sensor unit 130 has a certain width, and light may leak out of the scan range. Further, since the reflection light from the parabolic reflection mirror 140 or the like includes an element of diffused reflection in addition to the specular reflection, the light diffusely reflected outside the scan range may be incident on the sensor unit 130. Thus, in reality, stray light as noise may be generated by reflection outside the assumed optical path. Such stray light may affect the detection accuracy. The reflection surface 140a of FIG. 8 includes a second part R2 having low light reflectance. By arranging the second part R2 at an appropriate position, it is possible to attenuate an element of the light reflected by the reflection surface 140a which may affect the detection accuracy, and the detection accuracy can be improved.

It is desirable that the first part R1 is within a range where light is incident when the sensor unit 130 rotates and scans the emission light, and the second part R2 is within a range where light is not incident when the sensor unit 130 rotates and scans the emission light. When the sensor unit 130 rotates and scans the emission light, the light reflected at the second part R2 on the reflection surface 140a becomes stray light. When such light is incident on the sensor unit 130, it becomes noise, so it is desirable to lower the reflectance of light from outside the scan range.

As illustrated in FIG. 8, it is also desirable that the second part R2 is arranged surrounding the first part R1. This is because it is desirable to provide the second part R2 having low reflectance of light around the first part R1 since the reflection causing stray light is likely to occur around the scan range.

Next, a specific method of forming the first part R1 and the second part R2 will be described. When the entire parabolic reflection mirror 140 is made of a base member such as an aluminum alloy, the first part R1 and the second part R2 are made of the same base member. In this case, the surface of the base member of the second part R2 has a surface treated to reduce reflectance so that the reflectance of the second part R2 can be made lower than that of the first part.

As a specific example of a treatment for reducing the reflectance, a treatment for covering the surface of the second part R2 with a light absorbing material by applying a coating material having light absorbing properties, sticking a light absorbing film or the like, forming a light absorbing thin film (for example, deposition or plating) or the like can be applied. In addition, the surfaces of the first part R1 and the second part R2 may be covered with different materials using the above-described method. By using such a manufacturing method, the parabolic reflection mirror 140 can be manufactured more easily than when the first part R1 and the second part R2 are made of different base member.

As another example of the treatment of covering with the light absorbing material, the surface of the reflection surface 140a may be oxidized by anodic oxidation to form the light absorbing material. Alternatively, the surface of the second part R2 may be polished with a coarser abrasive material than the first part R1, and the surface roughness of the second part R2 may be made greater than that of the first part R1 to reduce the reflectance. According to these manufacturing methods, the parabolic reflection mirror 140 can be easily manufactured without separately supplying the light absorbing material.

However, different base members may be combined to form the first part R1 and the second part R2. In this case, a material having less reflectance than that of the base member of the first part is used as the base member of the second part R2. For example, by using a metal such as an aluminum alloy as the base member of the first part R1 and a resin or the like as the base member of the second part R2, the parabolic reflection mirror 140 can be made lightweight.

The reflection surface 160a illustrated in FIG. 9 includes the same configuration as the reflection surface 140a and exhibits the same effect.

As described above, according to the configuration of the reflection surface 140a and 160a illustrated in FIG. 8 and FIG. 9 of the present example embodiment, noise caused by stray light is reduced, and the ranging device 100 with improved detection accuracy is provided.

Note that, even if either one of the reflection surface 140a and 160a includes the first part R1 and the second part R2, an effect of improving detection accuracy can be obtained. However, it is desirable that both the reflection surface 140a and 160a include the first part R1 and the second part R2, because a higher effect can be obtained.

Second Example Embodiment

Next, as a second example embodiment of the present invention, a configuration example of a ranging device capable of translating a plane reflection mirror will be described. The description of components common to the above-described example embodiment is omitted or simplified.

Figure 10:
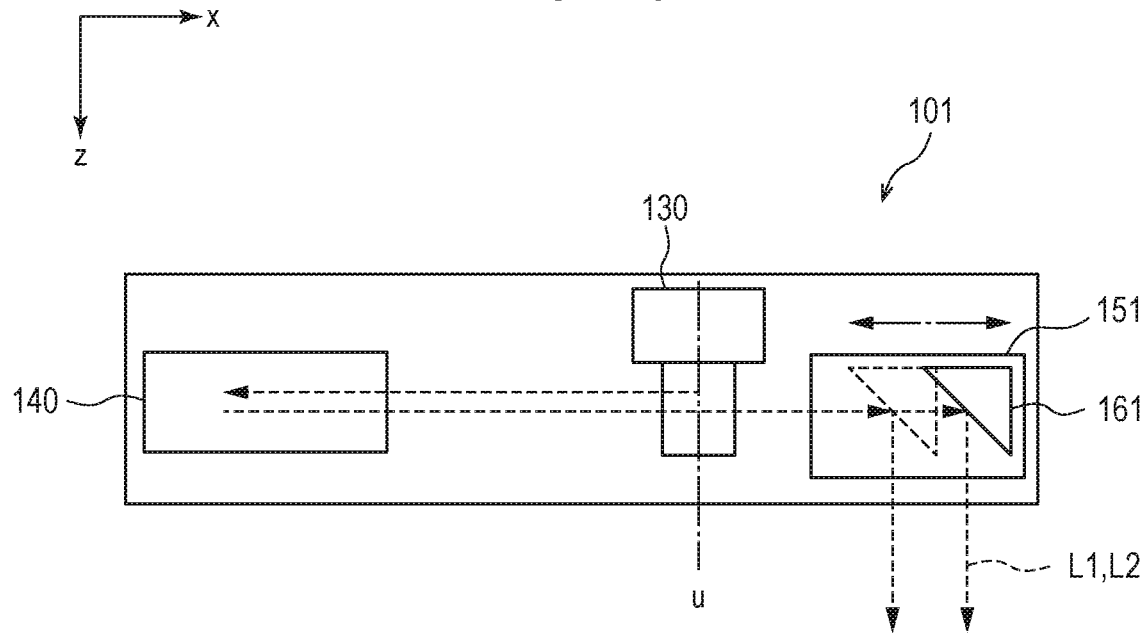
FIG. 10 is a schematic top view illustrating a structure of a ranging device according to a second example embodiment.

FIG. 10 is a schematic diagram illustrating a structure of a ranging device 101 of the present example embodiment as viewed from the top. The ranging device 101 of the present example embodiment is provided with a drive mechanism 151 instead of a position adjustment mechanism 150, and a plane reflection mirror 161 instead of a plane reflection mirror 160. The drive mechanism 151 drives the plane reflection mirror 161 to move parallel to the axial direction of the parabolic reflection mirror 140 (x-axis direction in FIG. 10). The drive mechanism 151 includes a drive device such as a motor. The drive mechanism 151 also includes a device for acquiring position information of the plane reflection mirror 161 such as an encoder. These devices are controlled by a control device 200. The position information of the plane reflection mirror 161 acquired by the drive mechanism 151 is supplied to the control device 200.

When the drive mechanism 151 drives the plane reflection mirror 161 to move parallel to the x-axis direction, the reflection light by the plane reflection mirror 161 also moves parallel to the x-axis direction. Thus, the ranging device 101 of the present example embodiment is capable of scanning to translate the reflection light by the plane reflection mirror 161 in the x-axis direction. As in the first example embodiment, the ranging device 101 of the present example embodiment is also capable of scanning to translate the reflection light by the plane reflection mirror 161 in the y-axis direction. Therefore, the ranging device 101 of the present example embodiment functions as a three-dimensional sensor device capable of acquiring three-dimensional position information by combining two-dimensional scan in the x-axis direction and the y-axis direction and distance measurement in the z-axis direction, in addition to obtaining the same effect as that of the first example embodiment.

Noted that, the parabolic reflection mirror 140 and the plane reflection mirror 161 of the present example embodiment may also have reflection surface including the first part R1 and the second part R2 as in the first example embodiment. In this case, the same effects as those described in the first example embodiment can be obtained. Accordingly, the ranging device 101 with improved detection accuracy is provided.

Third Example Embodiment

Next, as a third example embodiment of the present invention, a configuration example of a ranging device capable of rotating and moving a plane reflection mirror will be described. The description of components common to the first example embodiment is omitted or simplified.

Figure 11:
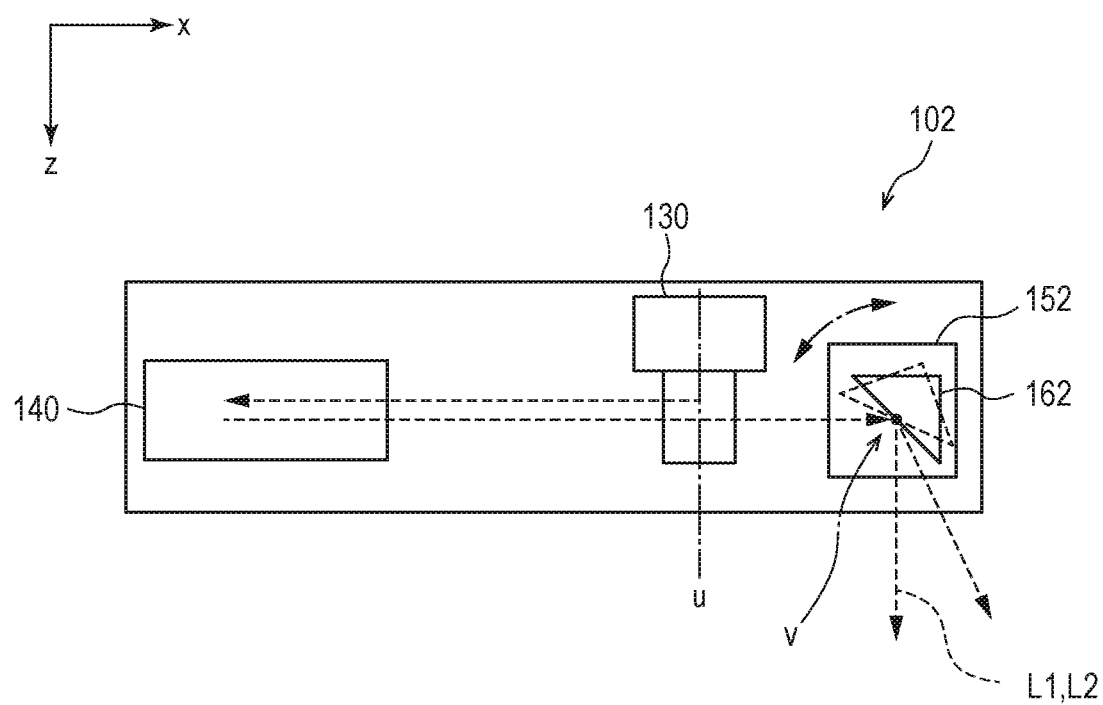
FIG. 11 is a schematic top view illustrating a structure of a ranging device according to a third example embodiment.

FIG. 11 is a schematic diagram illustrating a structure of a ranging device 102 of the present example embodiment as viewed from the top. The ranging device 102 of the present example embodiment is provided with a drive mechanism 152 instead of a position adjustment mechanism 150, and a plane reflection mirror 162 instead of a plane reflection mirror 160. The drive mechanism 152 drives the plane reflection mirror 162 to rotate about a rotation axis v parallel to the y-axis. The position of the rotation axis v may be a position where the direction of the reflection light from the plane reflection mirror 162 changes according to the rotation, and may be, for example, on a path through which the reflection light from the parabolic reflection mirror 140 passes. The drive mechanism 152 includes a drive device such as a motor. The drive mechanism 152 also includes a device for acquiring angle information of the plane reflection mirror 162 such as an encoder. These devices are controlled by a control device 200. The angle information of the plane reflection mirror 162 acquired by the drive mechanism 152 is supplied to the control device 200.

When the drive mechanism 152 drives the plane reflection mirror 162 and the plane reflection mirror 162 rotates, the direction of the reflection light from the plane reflection mirror 162 also rotates. Thus, the ranging device 102 of the present example embodiment can perform a scan to rotate and move the direction of the reflection light from the plane reflection mirror 162. As those described in the first example embodiment, the ranging device 102 of the present example embodiment is also capable of scanning the plane reflection mirror 162 so as to translate the reflection light in the y-axis direction. Therefore, the ranging device 102 of the present example embodiment functions as a three-dimensional sensor device capable of acquiring three-dimensional position information by combining rotational movement on the rotational axis v, parallel movement in the y-axis direction, and distance measurement, in addition to obtaining the same effect as in the first example embodiment.

Noted that, the parabolic reflection mirror 140 and the plane reflection mirror 162 of the present example embodiment may also have reflection surfaces including the first part R1 and the second part R2 as in the first example embodiment. In this case, the same effects as those described in the first example embodiment can be obtained. Accordingly, the ranging device 102 with improved detection accuracy is provided.

Fourth Example Embodiment

Next, as a fourth example embodiment of the present invention, a configuration example of a ranging device further including a logarithmic spiral reflection mirror will be described. The description of components common to the above-described example embodiments is omitted or simplified.

Figure 12:
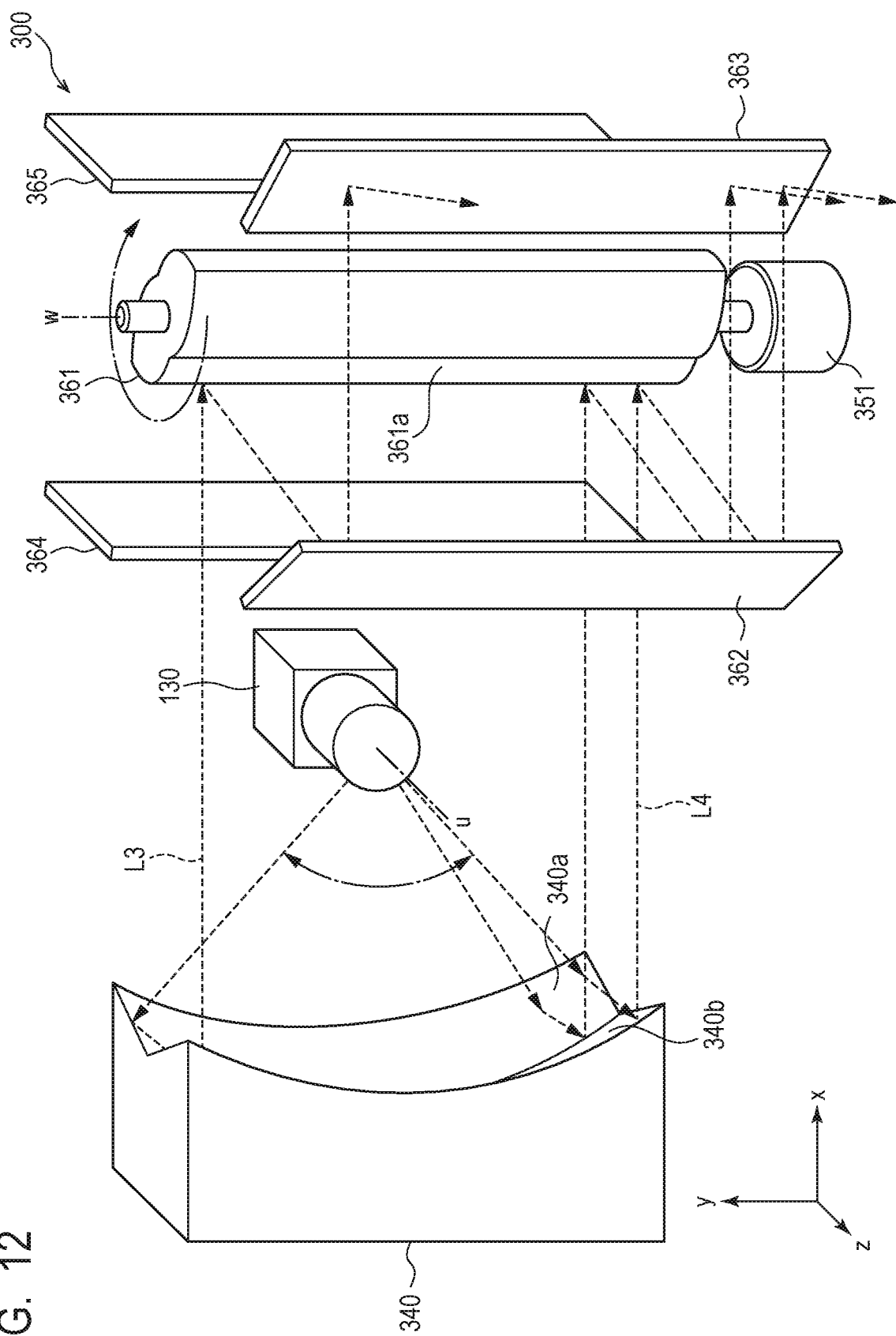
FIG. 12 is a schematic perspective view illustrating a structure of a ranging device according to a fourth example embodiment.
Figure 13:
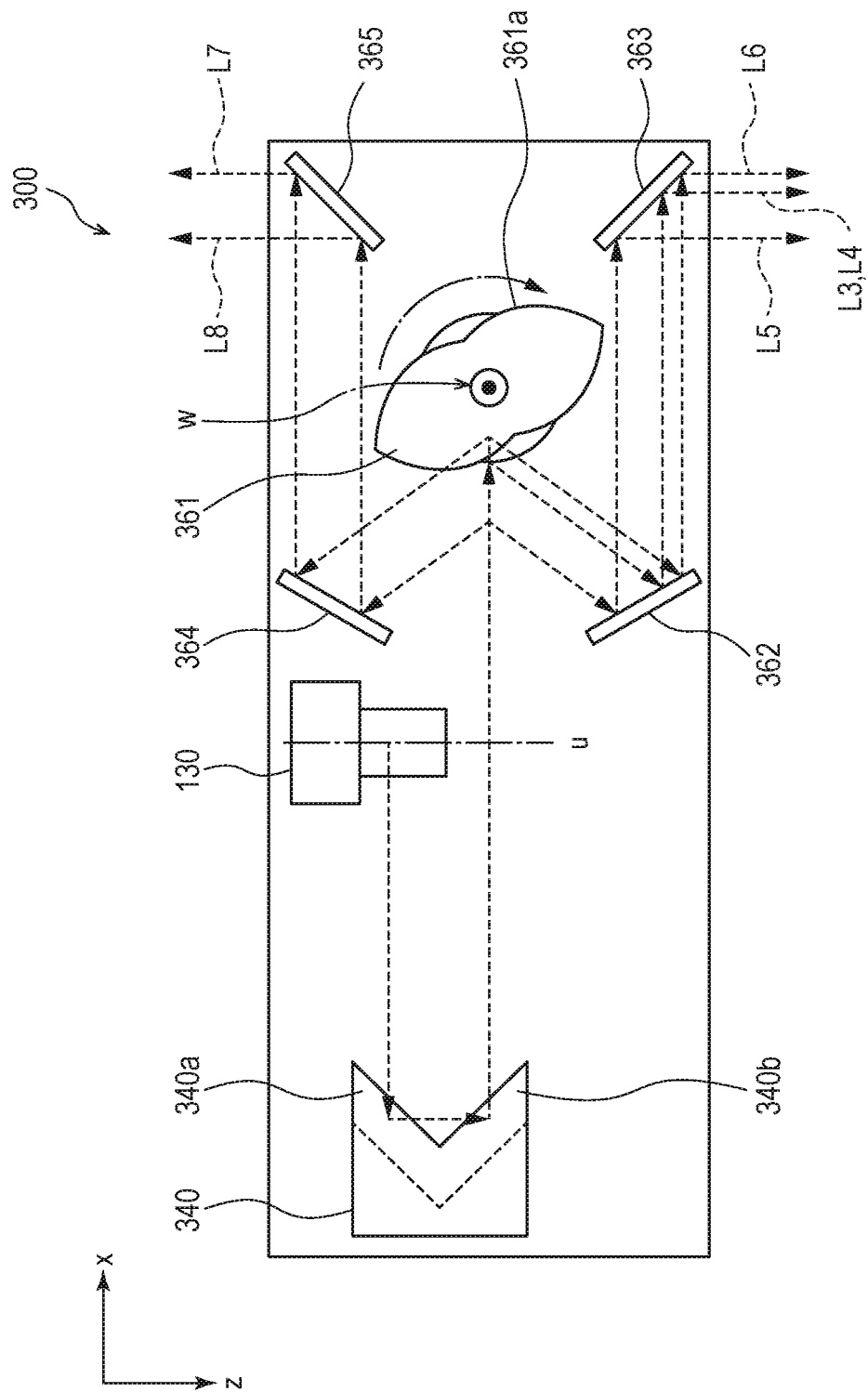
FIG. 13 is a schematic top view illustrating the structure of the ranging device according to the fourth example embodiment.

FIG. 12 is a schematic perspective view illustrating a structure of a ranging device 300 according to the fourth example embodiment. FIG. 13 is a schematic view illustrating the structure of the ranging device 300 as viewed from the top. The structure of the ranging device 300 will be described with reference to these figures. Note that, in FIG. 12 and FIG. 13, components that are not necessary for the description of an optical path, such as the base body 110, the lid body 120, and the mounting portion 170, may be omitted.

The ranging device 300 includes a sensor unit 130, a parabolic reflection mirror 340, a drive mechanism 351, a logarithmic spiral reflection mirror 361, and plane reflection mirrors 362, 363, 364, and 365. The parabolic reflection mirror 340 has reflection surfaces 340a and 340b. The reflection surfaces 340a and 340b form parabolas, in a section perpendicular to the rotation axis u (xy plane in FIG. 12), focusing on a point on the rotation axis u. The reflection surfaces 340a and 340b are perpendicular to each other in the xz plane as illustrated in FIG. 13.

Light emitted from the sensor unit 130 in the negative direction of the x-axis is reflected in the z-axis direction by the reflection surface 340a, and then reflected in the positive direction of the x-axis toward the logarithmic spiral reflection mirror 361 by the reflection surface 340b. By causing the reflection surfaces 340a and 340b to reflect twice to shift the optical path in the z direction, the reflection light from the parabolic reflection mirror 340 can be prevented from being inhibited by the sensor unit 130. Further, since the reflection light does not re-enter the sensor unit 130, the detection accuracy can be improved for the same reason as that described with reference to FIGS. 5 to 7.

The logarithmic spiral reflection mirror 361 has a columnar shape, and has a reflection surface 361a forming a logarithmic spiral on the side faces thereof. The light emitted from the sensor unit 130 is reflected by the reflection surface 361a. The logarithmic spiral reflection mirror 361 is rotatable about a rotation axis w by the drive mechanism 351. At this time, the light reflected by the reflection surface 361a moves in parallel according to the angle of the logarithmic spiral reflection mirror 361.

Figure 14:
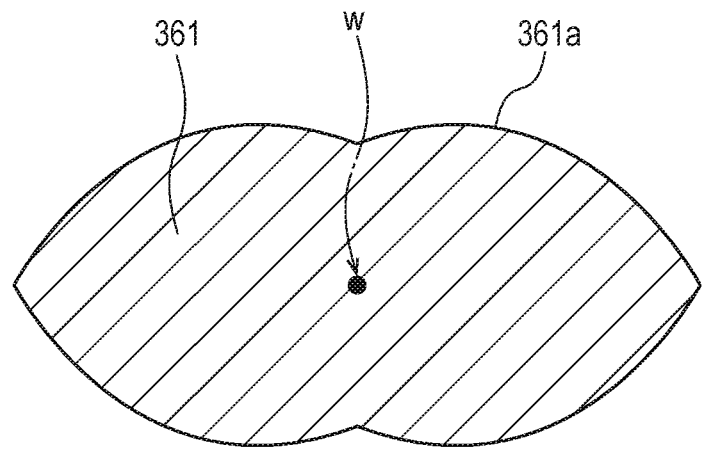
FIG. 14 is a sectional view of the logarithmic spiral reflection mirror of the ranging device according to the fourth example embodiment.
Figure 15:
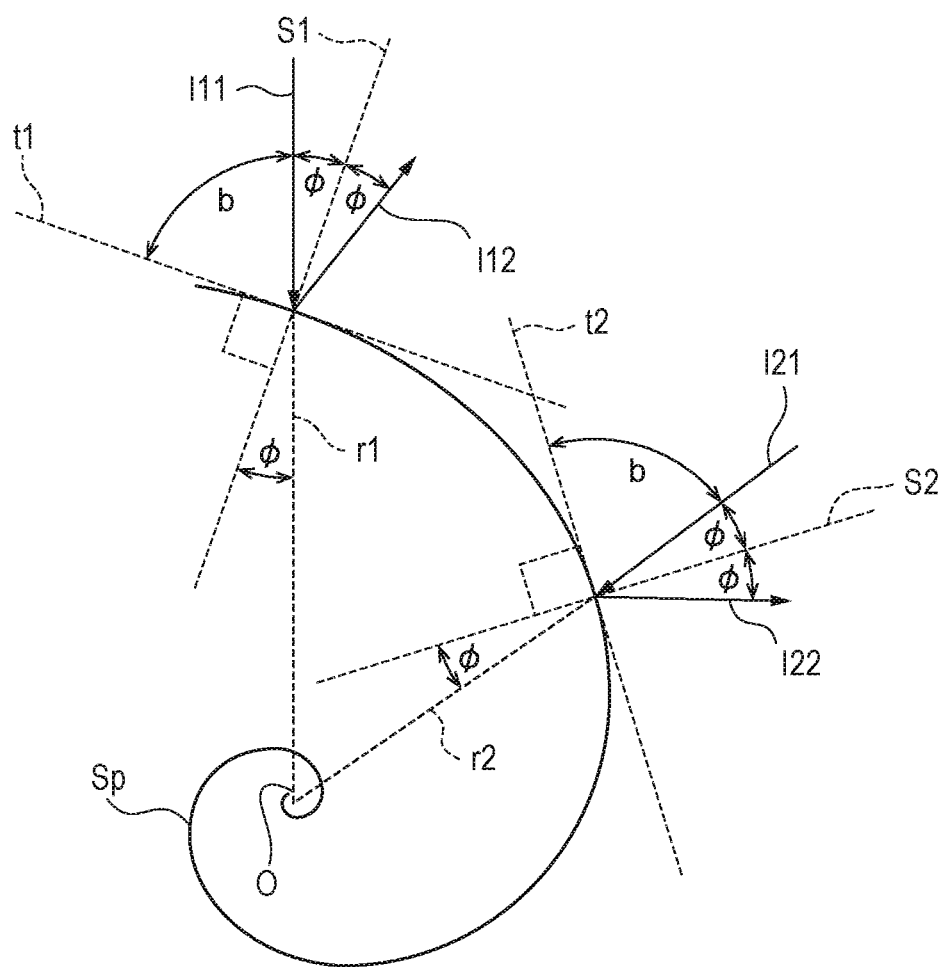
FIG. 15 is a diagram illustrating a reflection of light at the reflection surface forming a logarithmic spiral.

With reference to FIG. 14 and FIG. 15, a more specific structure of the logarithmic spiral reflection mirror 361 will be described. FIG. 14 is a sectional view of the logarithmic spiral reflection mirror 361 according to the present example embodiment in a plane perpendicular to the rotation axis w. The reflection surface 361a that is the side face of the logarithmic spiral reflection mirror 361 forms a closed curve in which four logarithmic spirals are continuously connected in a cross section perpendicular to the rotation axis w. With a closed curve in which logarithmic spirals are continuously connected as described above, a configuration in which the entire reflection surface 361a that light emitted from the sensor unit 130 may enter forms a logarithmic spiral in a cross section perpendicular to the rotation axis w is realized. Accordingly, even when light enters any of the surfaces of the logarithmic spiral reflection mirror 361, it is possible to utilize reflected light for a scan. Note that, a logarithmic spiral may be referred to as an equiangular spiral or a Bernoulli's spiral.

FIG. 15 is a diagram illustrating reflection of light by a reflection surface forming a logarithmic spiral. The logarithmic spiral Sp is expressed by a polar equation of the following Equation (2):

[Math. 2]

$$r = a \cdot \exp(\theta \cdot \cot b) \tag{2}$$

where r denotes the radial coordinate in the polar coordinate, θ denotes the angular coordinate in the polar coordinate, a denotes the value of r when the value of θ is zero, and b denotes the angle of a line passing through the center of the logarithmic spiral relative to a tangent line of the logarithmic spiral.

Herein, the relationship between the incident light I11 and I21 from the outside of the logarithmic spiral Sp toward the origin O of the polar equation of Equation (2) and the reflected light I12 and I22 thereof is considered. The tangent line and the normal line at a point at which the incident light I11 is reflected by the logarithmic spiral Sp are defined as t1 and S1, respectively, and the tangent line and the normal line at a point at which the incident light I21 is reflected by the logarithmic spiral Sp are defined as t2 and S2, respectively. It is assumed that the incident light I11 is reflected at a point of the radial coordinate r1 on the logarithmic spiral Sp, and the incident light I21 is reflected at a point of the radial coordinate r2 on the logarithmic spiral Sp (where r1≠r2). In this example, due to a nature of the logarithmic spiral Sp, both of the angle of the incident light I11 relative to the tangent line t1 and the angle of the incident light I21 relative to the tangent line t2 are b. Therefore, the incident angle φ of the incident light I11 relative to the normal line S1 and the incident angle φ of the incident light I21 relative to the normal line S2 are the same angle. Also, the reflection angle φ of the reflected light I12 relative to the normal line S1 and the reflection angle φ of the reflected light I22 relative to the normal line S2 are the same angle. When φ and b are angles expressed in the circular measure, the relationship between φ and b is as expressed by the following Equation (3).

[Math. 3]

$$\phi = \frac{\pi}{2} - b \tag{3}$$

From the above discussion, it is found that the incident light I11 from the outside of the logarithmic spiral Sp toward the origin O is reflected at the same reflection angle φ even when reflected at any point on the logarithmic spiral Sp. Thus, when the logarithmic spiral Sp is rotated on the origin O, the point at which the incident light I11 to the logarithmic spiral Sp is reflected changes, but the direction in which the reflected light I12 is reflected does not change, and therefore the reflected light I12 moves in parallel.

In the logarithmic spiral reflection mirror 361 of the present example embodiment, to utilize the above nature, at least a part of a reflection surface forms a logarithmic spiral in which the rotation axis w matches the origin O in a cross section perpendicular to the rotation axis w. Accordingly, rotation of the logarithmic spiral reflection mirror 361 on the rotation axis w enables a scan so that the light reflected by the reflection surface 361a moves in parallel.

Returning again to FIG. 13, the parallel scan by the reflection light by the logarithmic spiral reflection mirror 361 will be described. The light reflected by the logarithmic spiral reflection mirror 361 is made incident and reflected on either the plane reflection mirror 362 or the plane reflection mirror 364 according to the angle of the logarithmic spiral reflection mirror 361. The light reflected by the plane reflection mirror 362 is reflected by the plane reflection mirror 363 and emitted to the outside of the ranging device 300. The light emission direction at this time is a positive direction of the z-axis. The light reflected by the plane reflection mirror 364 is reflected by the plane reflection mirror 365 and emitted to the outside of the ranging device 300. The light emission direction at this time is a negative direction of the z-axis.

When the logarithmic spiral reflection mirror 361 rotates clockwise as illustrated in FIG. 13, the light emitted from the ranging device 300 moves in parallel from the optical path L5 toward the optical path L6. When the logarithmic spiral reflection mirror 361 further rotates while the emission light is in the optical path L6, the emission light changes discontinuously from the optical path L6 to the optical path L7. Thereafter, the emission light moves in parallel from the optical path L7 toward the optical path L8, and changes discontinuously from the optical path L8 to the optical path L5. As described above, the ranging device 300 of the present example embodiment can alternately scan the positive direction and the negative direction of the z-axis.

Thus, ranging device 300 of the present example embodiment is capable of scanning to translate the emission light in the x-axis direction. As in the case of the first example embodiment, the ranging device 300 of the present example embodiment is also capable of scanning to move the emission light in parallel in the y-axis direction. Therefore, the ranging device 300 of the present example embodiment functions as a three-dimensional sensor device capable of acquiring three-dimensional position information by combining two-dimensional scan in the x-axis direction and the y-axis direction and distance measurement in the z-axis direction, in addition to obtaining the same effect as that of the first example embodiment. Further, since the ranging device 300 of the present example embodiment can alternately scan the positive direction and the negative direction of the z-axis, distance measurement in two different directions can be performed by one ranging device 300.

Figure 16:
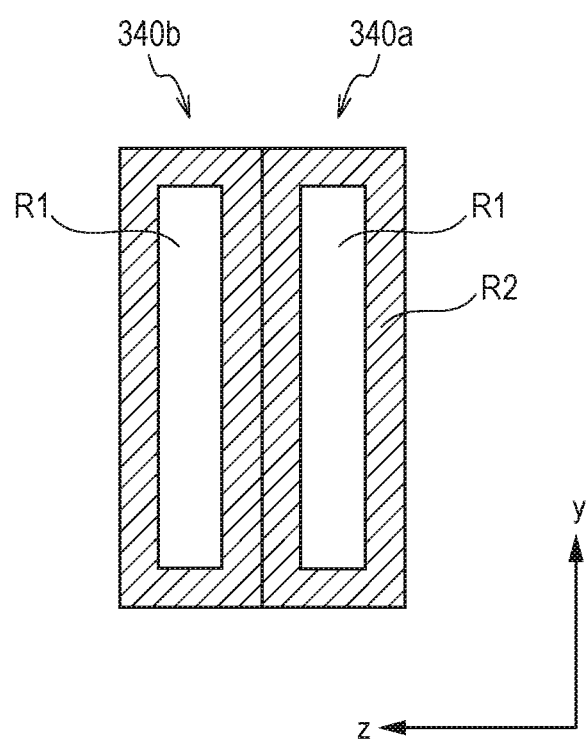
FIG. 16 is a schematic diagram illustrating a configuration example of the reflection surface according to the fourth example embodiment.
Figure 17:
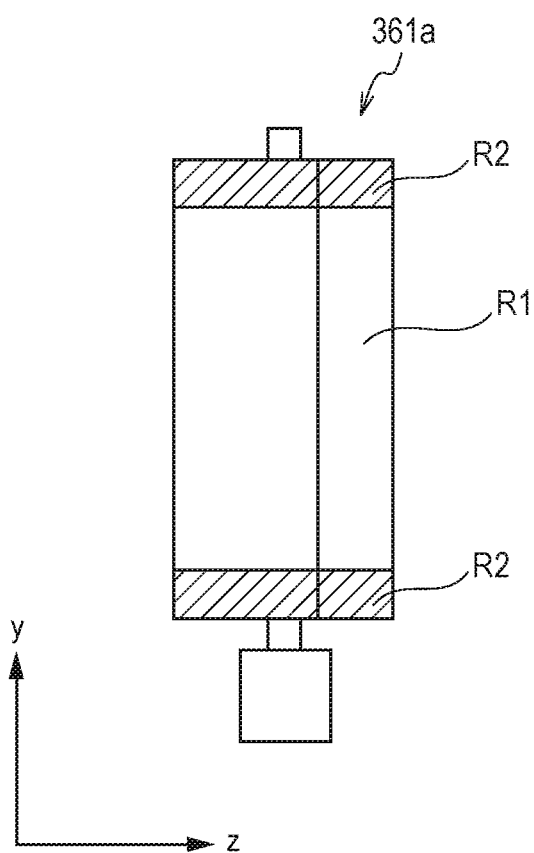
FIG. 17 is a schematic diagram illustrating a configuration example of the reflection surface according to the fourth example embodiment.
Figure 18:
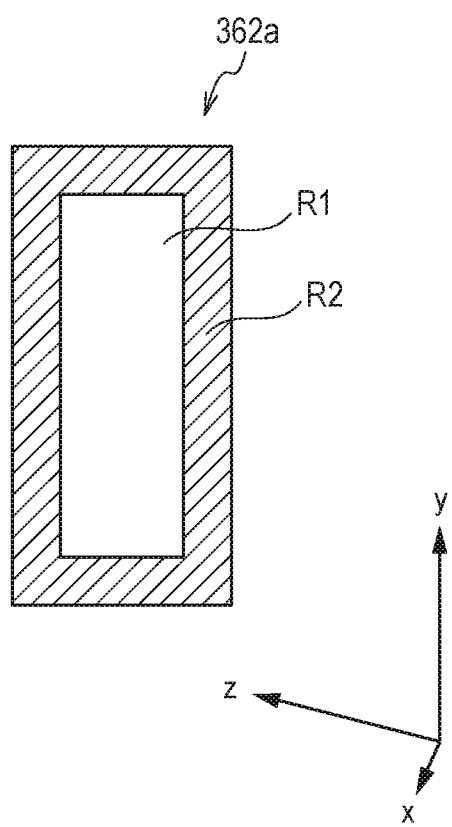
FIG. 18 is a schematic diagram illustrating a configuration example of the reflection surface according to the fourth example embodiment.

With reference to FIG. 16, FIG. 17, and FIG. 18, a more specific configuration example of the reflection surface of each reflection mirror will be described. FIG. 16 is a schematic view illustrating a configuration example of the reflection surfaces 340a and 340b of the parabolic reflection mirror 340, FIG. 17 is a schematic view illustrating a configuration example of the reflection surface 361a of the logarithmic spiral reflection mirror 361, and FIG. 18 is a schematic view illustrating a configuration example of the reflection surface 362a of the plane reflection mirror 362. The same configuration as that of the reflection surface 362a of FIG. 18 may be applied to the reflection surface of the plane reflection mirrors 363, 364 and 365 illustrated in FIG. 12.

As illustrated in FIG. 16, the reflection surfaces 340a and 340b include a first part R1 and a second part R2, respectively. In each of the reflection surfaces 340a and 340b, the second part R2 is arranged surrounding the first part R1.

As illustrated in FIG. 17, the reflection surface 361a includes a first part R1 and a second part R2. The second part R2 is arranged above and below the first part R1.

As illustrated in FIG. 18, the reflection surface 362a includes a first part R1 and a second part R2. The second part R2 is arranged surrounding the first part R1.

As in the first example embodiment, the reflectance of light of the second part R2 is less than that of the first part. The reflection surfaces 340a, 340b, 361a, and 362a of the first part R1 and the second part R2 are formed by a manufacturing method as that described in the first example embodiment.

Also in the present example embodiment, noise caused by stray light is reduced for the same reason as that described in the first example embodiment. Thus, the ranging device 300 with improved detection accuracy is provided.

Fifth Example Embodiment

Next, as a fifth example embodiment of the present invention, a configuration example of a ranging device including two optical systems will be described. The description of components common to the above-described example embodiments is omitted or simplified.

Figure 19:
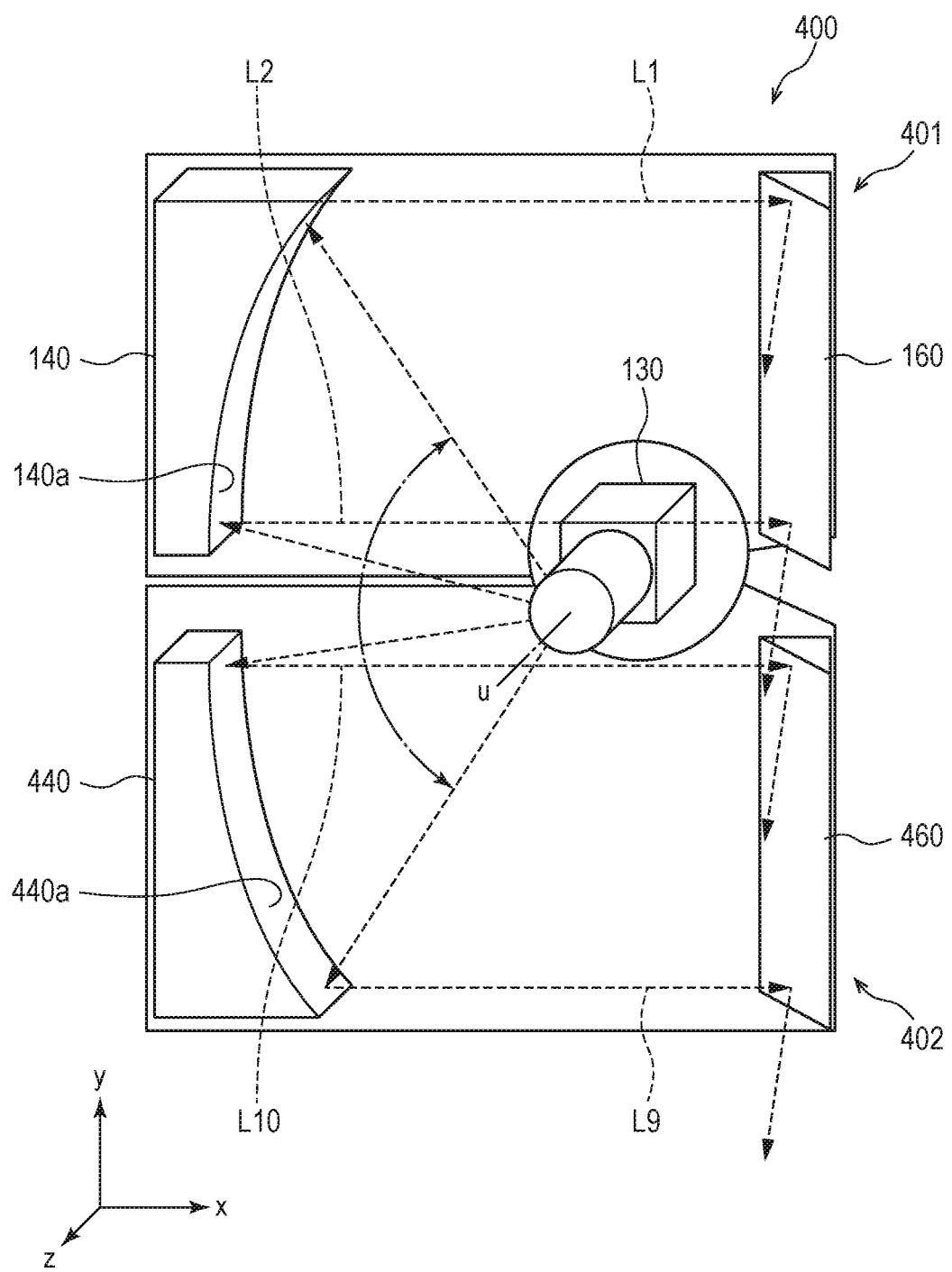
FIG. 19 is a schematic front view illustrating a structure of a ranging device according to a fifth example embodiment.
Figure 20:
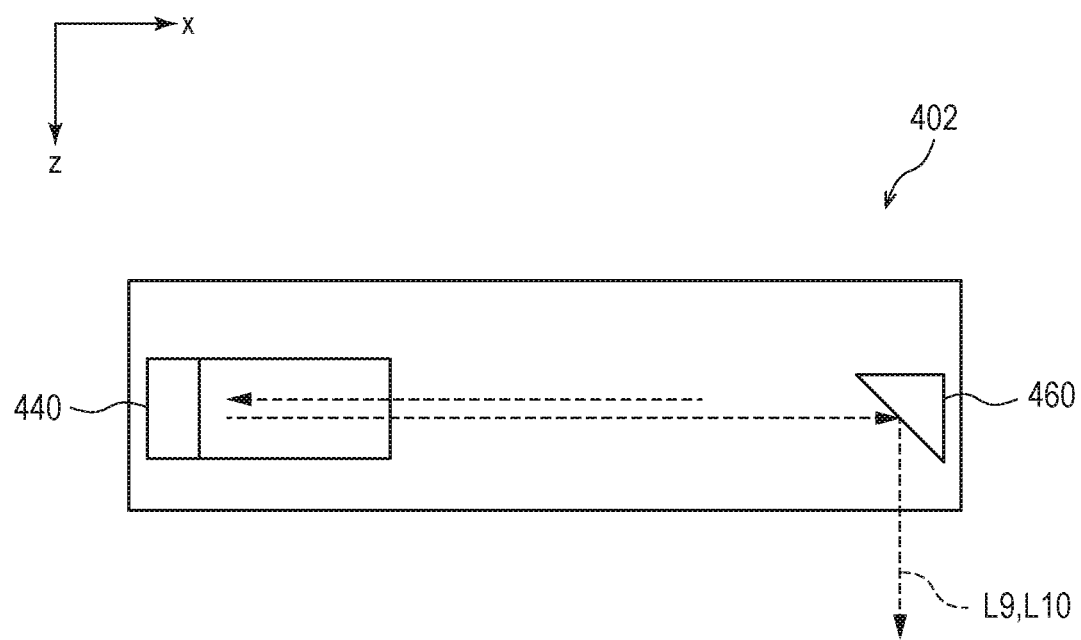
FIG. 20 is a schematic top view illustrating the structure of the ranging device according to the fifth example embodiment.

FIG. 19 is a schematic view illustrating a structure of a ranging device 400 according to a fifth example embodiment as viewed from the front. FIG. 20 is a schematic view illustrating the structure of the ranging device 400 as viewed from the top. The structure of the ranging device 400 will be described with reference to these figures.

The ranging device 400 includes a first optical system 401 and a second optical system 402. The first optical system 401 includes a sensor unit 130, a parabolic reflection mirror 140, and a plane reflection mirror 160. Since the first optical system 401 is the same as the ranging device 100 of the first example embodiment, the description thereof is omitted. Note that, the top view of the first optical system 401 is the same as that of FIG. 4.

The second optical system 402 includes a parabolic reflection mirror 440 and a plane reflection mirror 460. The parabolic reflection mirror 440 has reflection surface 440a. The reflection surface 440a forms a parabola with a point on the rotation axis u as a focal point in a section perpendicular to the rotation axis u (xy plane in FIG. 19). The parabolic reflection mirror 440 has a line-symmetric structure with the parabolic reflection mirror 140. The plane reflection mirror 460 has a line-symmetric structure with the plane reflection mirror 160. The parabolic reflection mirror 140 and the parabolic reflection mirror 440 are arranged at positions symmetrical to the axis of the parabola. The plane reflection mirror 160 and the plane reflection mirror 460 are arranged at positions symmetrical to the axis of the parabola. Note that, the structure of a housing for storing the components of the second optical system 402 may be, for example, a housing illustrated in FIG. 2 of the first example embodiment reversed in the y direction.

When light is emitted from the sensor unit 130 in the lower left direction in the figure, it is incident on the reflection surface 440a. The light reflected by the reflection surface 440a becomes parallel to the axis of the parabola like the optical paths L9 and L10. The light reflected by the reflection surface 440a, as illustrated in FIG. 20, is emitted to the outside of the second optical system 402.

The reflection surface 140a of the parabolic reflection mirror 140 and the reflection surface 440a of the parabolic reflection mirror 440 are provided so as to exclude the vertex of the parabola. This configuration corresponds to the optical path diagram illustrated in FIG. 7. Thus, as described with reference to FIGS. 5 to 7, since the reflection light at the vertex of the parabola is not re-incident on the sensor unit 130, the reduction of the detection accuracy can be suppressed. Therefore, in the present example embodiment as well as in the first example embodiment, it is possible to provide the ranging device 400 with improved detection accuracy. Further, in the present example embodiment, the scan range of the emission light can be widened by using two optical systems.

Noted that, the parabolic reflection mirror 140 and 440 and the plane reflection mirror 160 and 460 of the present example embodiment may also have reflection surfaces including the first part R1 and the second part R2 as in the first example embodiment. In this case, the same effects as those described in the first example embodiment can be obtained. Accordingly, the ranging device 400 with improved detection accuracy is provided.

Sixth Example Embodiment

Next, as a sixth example embodiment of the present invention, a configuration example of a ranging device including a logarithmic spiral reflection mirror and two parabolic reflection mirrors will be described. The description of components common to the above-described example embodiments is omitted or simplified.

Figure 21:
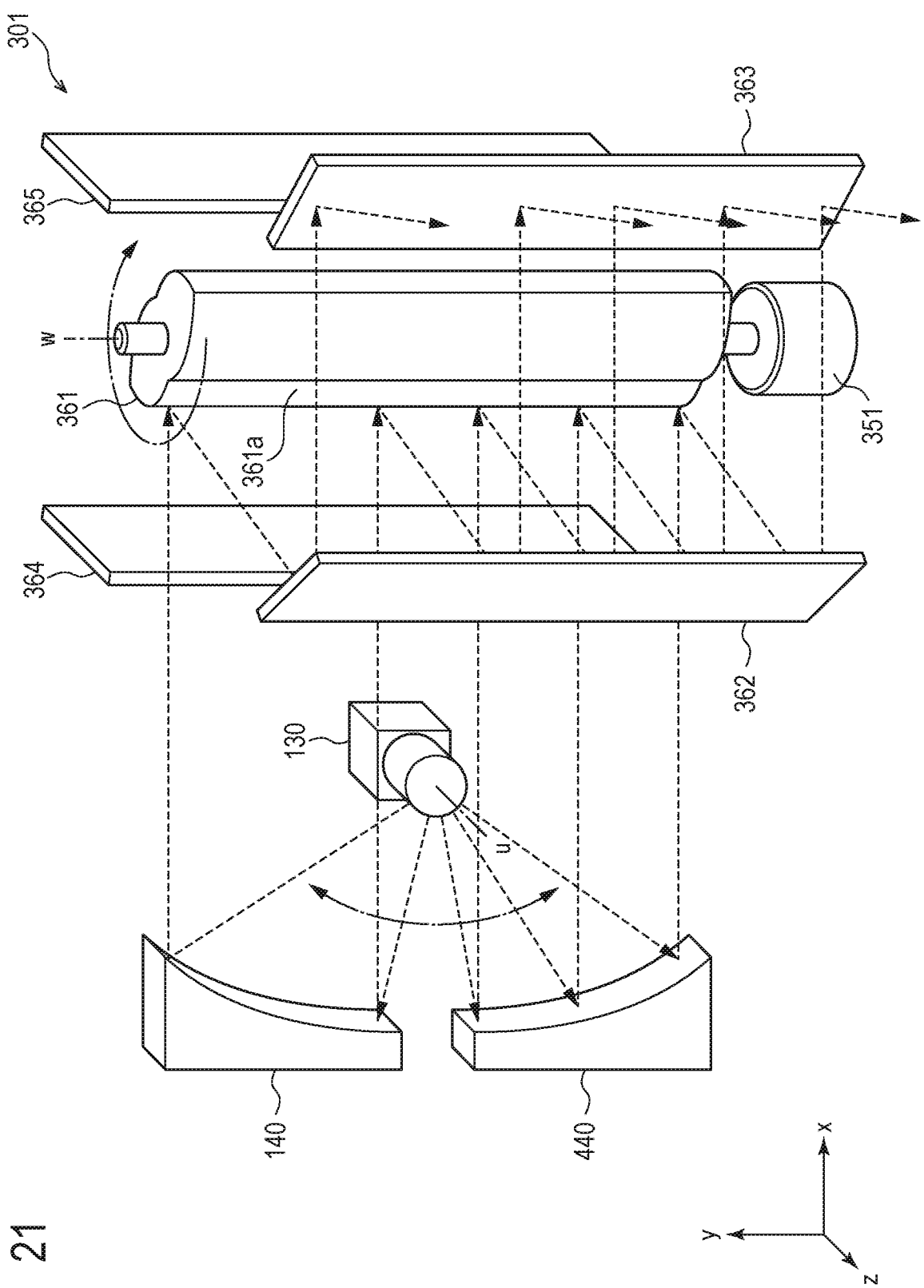
FIG. 21 is a schematic perspective view illustrating the structure of a ranging device according to a sixth example embodiment.
Figure 22:
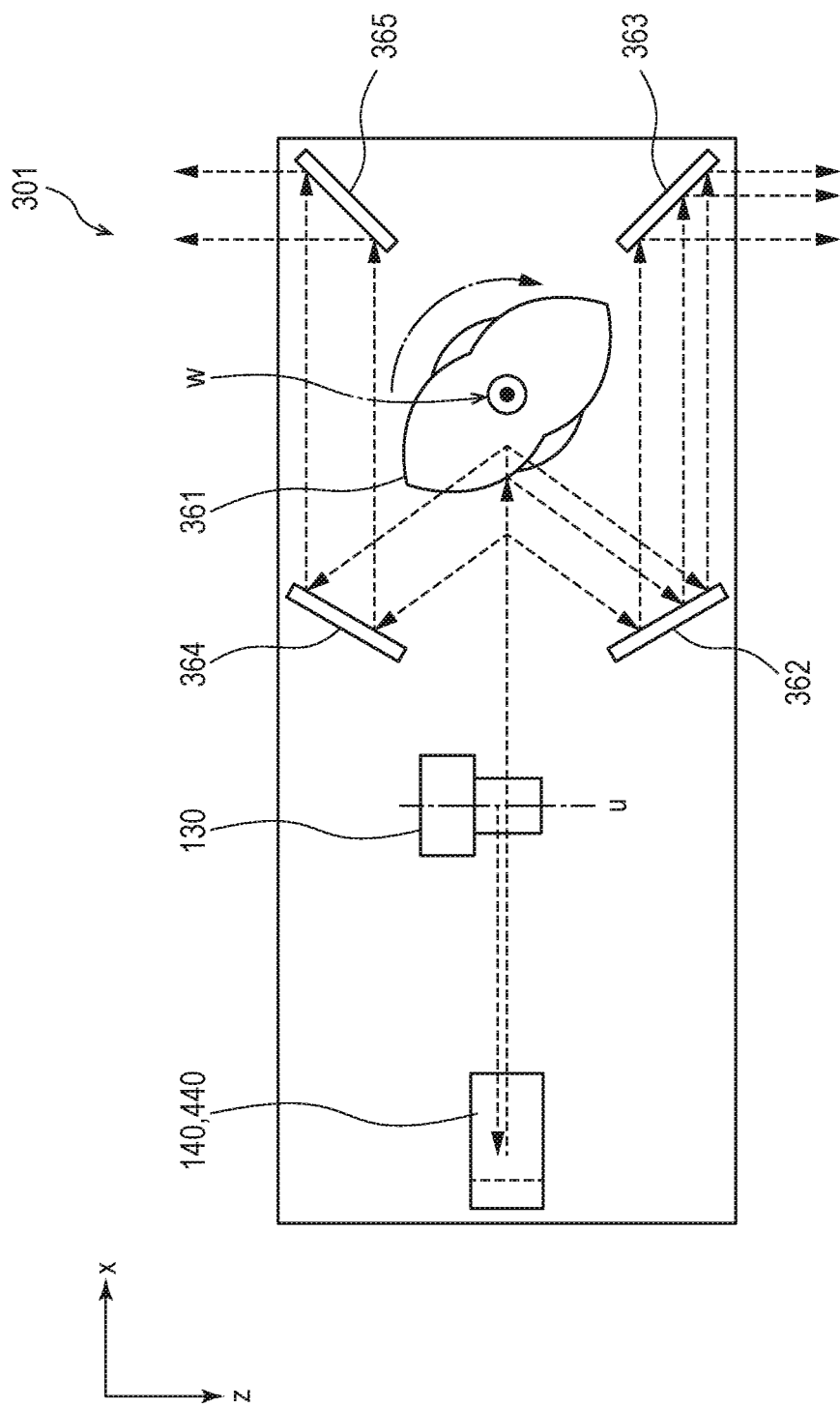
FIG. 22 is a schematic top view illustrating the structure of the ranging device according to the sixth example embodiment.

FIG. 21 is a schematic diagram illustrating a structure of a ranging device 301 according to a sixth example embodiment as viewed from an angle. FIG. 22 is a schematic view illustrating the structure of the ranging device 301 as viewed from the top. The ranging device 301 of the present example embodiment is a ranging device that the parabolic reflection mirror 340 of the ranging device 300 of the fourth example embodiment is replaced with the parabolic reflection mirror 140 and parabolic reflection mirror 440 of the fifth example embodiment. In the present example embodiment, the same effects as in the fourth example embodiment can be obtained. In the present example embodiment, the structure of the parabolic reflection mirror is simplified as compared with the fourth example embodiment.

Note that, the parabolic reflection mirrors 140 and 440, the logarithmic spiral reflection mirror 361 and the plane reflection mirrors 362, 363, 364 and 365 of the present example embodiment may also include reflection surface including the first part R1 and the second part R2 as in the fourth example embodiment. In this case, the same effects as those described in the fourth example embodiment can be obtained. Accordingly, the ranging device 301 with improved detection accuracy is provided.

Seventh Example Embodiment

Next, as a seventh example embodiment of the present invention, a configuration example of an article display shelf including a ranging device 400 in the fifth example embodiment will be described. The description of components common to the above-described example embodiments is omitted or simplified.

Figure 23:
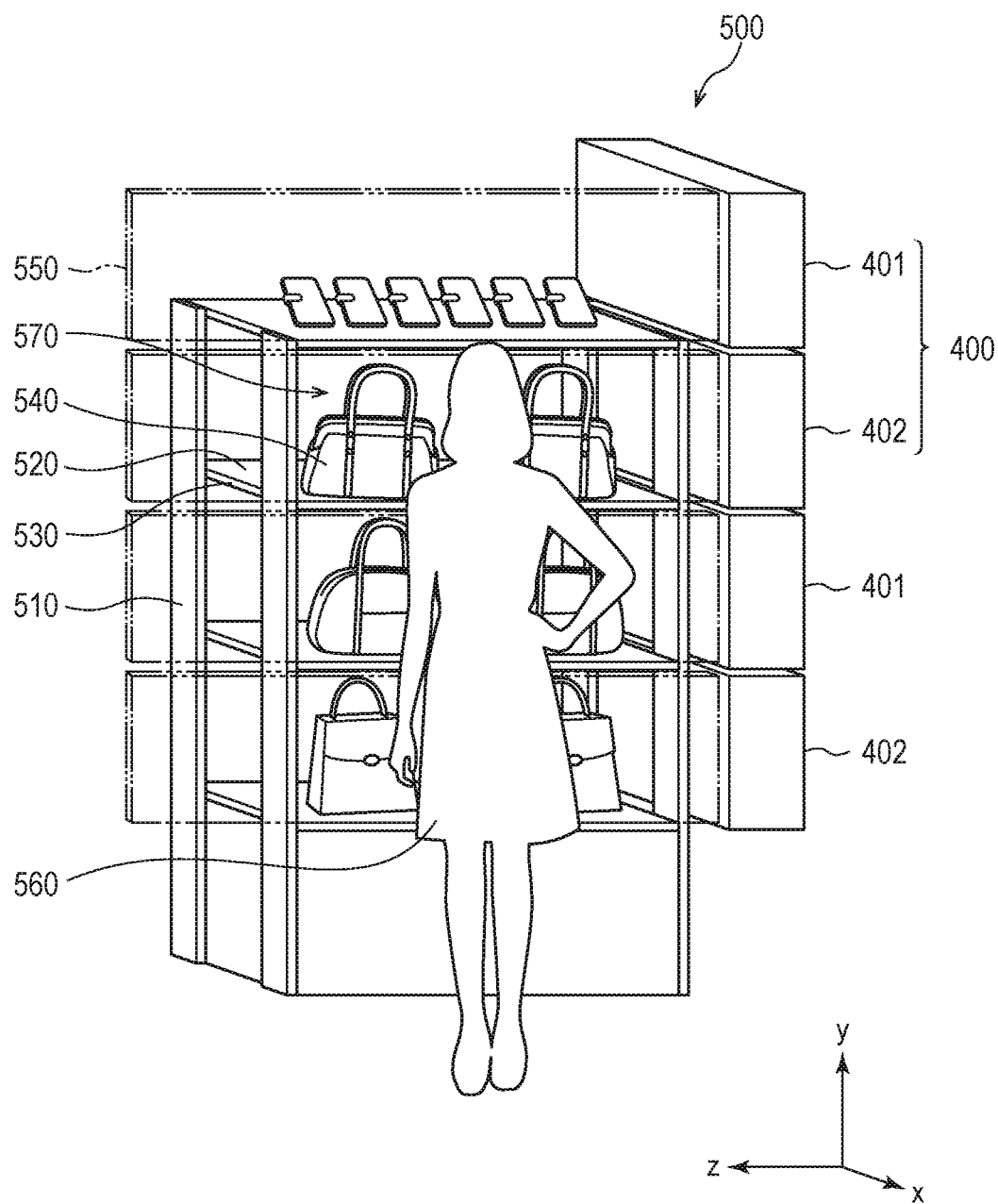
FIG. 23 is a schematic perspective view illustrating a structure of an article display shelf according to a seventh example embodiment.
Figure 24:
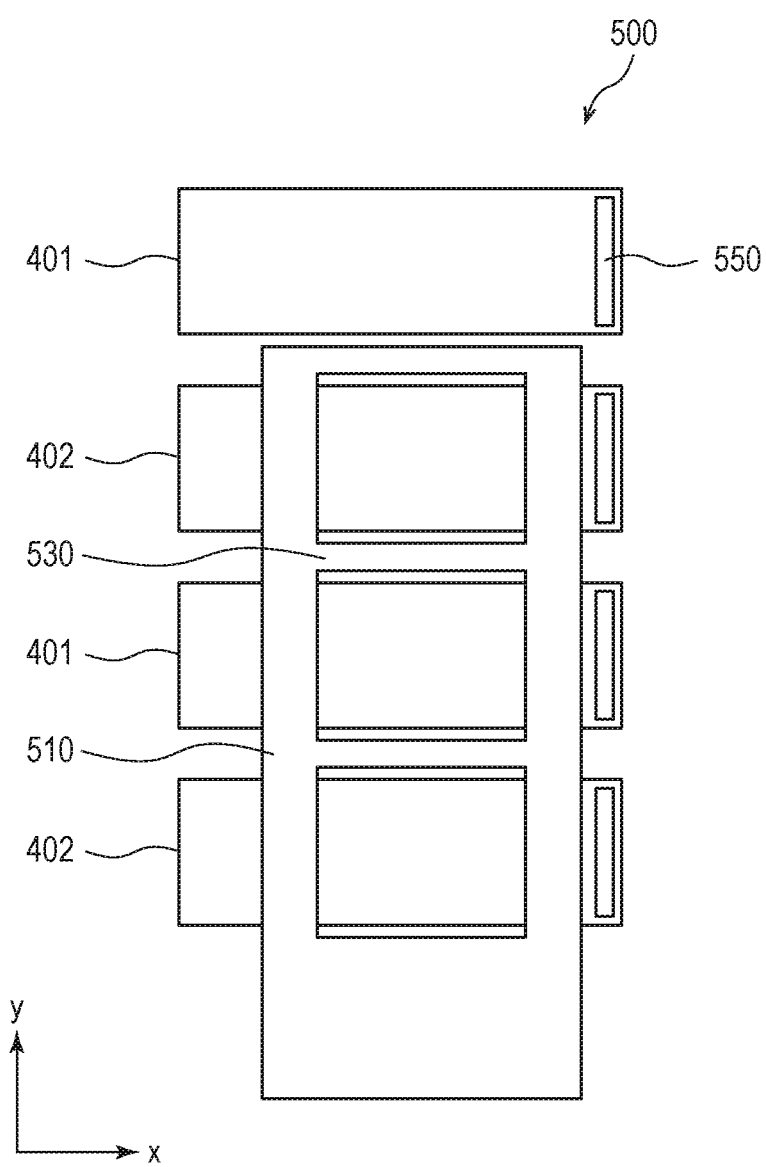
FIG. 24 is a schematic side view illustrating the structure of the article display shelf according to the seventh example embodiment.

FIG. 23 is a schematic perspective view of an article display shelf 500 according to a seventh example embodiment. FIG. 24 is a schematic side view of the article display shelf 500. The structure of the article display shelf 500 will be described with reference to these figures.

The article display shelf 500 is a shelf for displaying articles 540 and may be, for example, a goods display shelf installed in a commercial facility. The article display shelf 500 includes a shelf 510 and two ranging devices 400. The two ranging devices 400 are arranged on the side surface of the shelf 510. The shelf 510 is provided with four display portions 520 divided by display plates 530. In the display portion 520, articles 540 such as goods are displayed. The display portion 520 includes an opening portion 570 for taking in and out the article 540. The number of the ranging device 400 and the display portion 520 is not limited to those illustrated in the diagrams, and may be plural or single.

The ranging device 400 includes the first optical system 401 and the second optical system 402 described in the fifth example embodiment. Light that passes through the first optical system 401 or the second optical system 402 and emits in the positive direction of the z-axis passes across the front of the opening portion 570 of the display portion 520. As a result, in front of the opening portion 570 of the display portion 520, a detection region 550 by the ranging device 400 is formed. When the customer 560 takes out the article 540 from the display portion 520 or returns the taken out article 540 to the display portion 520, the article 540 and the hand of the customer 560 pass through the detection region 550. The ranging device 400 detects the article 540 or the hand of the customer 560 passing through the detection region 550 to detect the taking in and out of the article 540. When a plurality of articles 540 may be arranged in the display portion 520, the ranging device 400 may detect the position where the article 540 has been taken in and out or the shape of the article 540 which has been taken in and out to specify the article 540 which has been taken in and out.

The article display shelf 500 of the present example embodiment is provided with the ranging device 400, so that it is possible to detect the taking in and out of the articles 540 on display. This function may be used, for example, for the management of goods and the prevention of theft. Further, as described above, since the ranging device 400 has a small thickness in the light emission direction, it is possible to install it in a narrow space on the side surface of the article display shelf 500. Thus, the size of the whole article display shelf 500 can be reduced.

Although it is not essential, as illustrated in FIG. 23, it is desirable that the position of the shelf plate 530 in the y-axis direction is between the first optical system 401 and the second optical system 402. In the ranging device 400 according to the fifth example embodiment, an insensitive area is formed between the first optical system 401 and the second optical system 402, but the insensitive area can be substantially narrowed by arranging the shelf plate 530 in the insensitive area.

In other words, the configuration that the shelf plate 530 is arranged in the above-described insensitive area can be described as follows. In FIG. 23, the display portions 520 at the first and third stages from the top are called the first display portion, and the display portions 520 at the second and fourth stages from the top are called the second display portion. The opening portion 570 corresponding to the first display portion is called a first opening portion, and the opening portion 570 corresponding to the second display portion is called a second opening portion. At this time, as illustrated in FIG. 23, the light emitted from the first optical system 401 is arranged so as to cross the front of the first opening portion, and the light emitted from the second optical system 402 is arranged so as to cross the front of the second opening portion. In this case, the first display portion and the second display portion are separated from each other by the shelf plate 530, and the position of the shelf plate 530 corresponds to the insensitive area between the first optical system 401 and the second optical system 402.

Note that, the ranging device 400 of the fifth example embodiment has been described as an example of the ranging device installed on the article display shelf 500 of the present example embodiment, the ranging device of other example embodiments may be used.

For the article display shelf 500, it is more desirable to use the ranging device including the reflection surfaces of the first part R1 and the second part R2 described in the first to the sixth example embodiments, and in this case, the detection accuracy of taking in and out of the article 540 is further improved.

Eighth Example Embodiment

Next, as an eighth example embodiment of the present invention, a configuration example of an article display shelf that the arrangement of the ranging device is changed with respect to the seventh example embodiment will be described. The description of components common to the above-described example embodiments is omitted or simplified.

Figure 25:
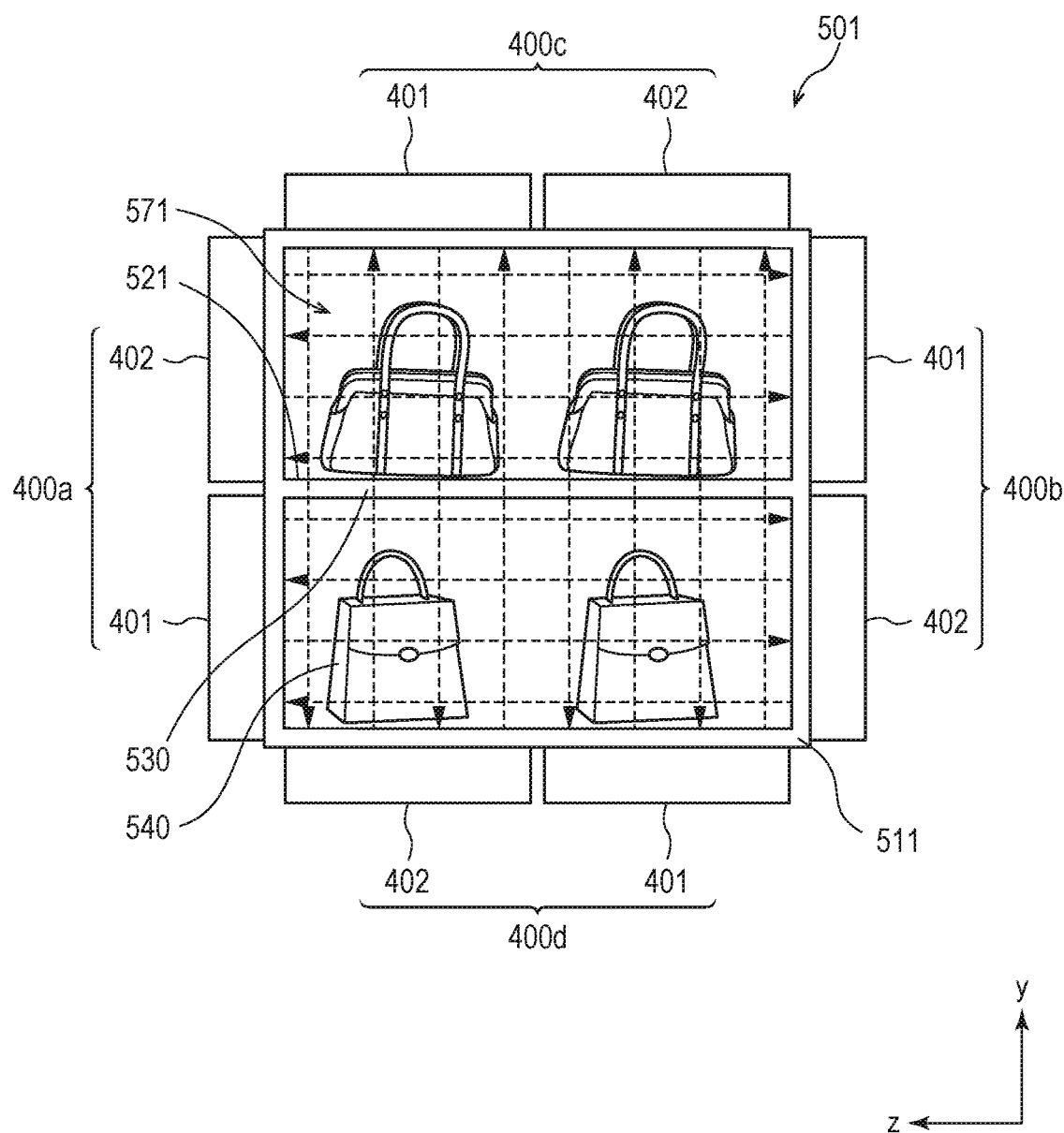
FIG. 25 is a schematic front view illustrating a structure of an article display shelf according to an eighth example embodiment.

FIG. 25 is a schematic front view of an article display shelf 501 according to the eighth example embodiment. The article display shelf 501 of the present example embodiment includes a shelf 511 and four ranging devices 400a, 400b, 400c, and 400d arranged around the shelf 511. In the article display shelf 501 of the present example embodiment, the arrangement of the ranging device is different from that in the seventh example embodiment. The ranging device 400a is arranged on the left side surface of the shelf 511. The ranging device 400b is arranged on the right side surface of the shelf 511. The ranging device 400c is arranged on the upper surface of the shelf 511. The ranging device 400d is arranged on the lower surface of the shelf 511. Light emitted from each ranging device 400 passes across the front of the display portion 520. As a result, a detection region is formed in front of the opening portion 571 of the display portion 521 by the ranging device 400, and the ranging device 400 can detect the taking in and out of the article 540.

In the present example embodiment, the ranging device 400a (first sensor device) emits light in a first direction which is a positive direction of the z-axis, and the ranging device 400b (second sensor device) emits light in a second direction which is a negative direction of the z-axis. That is, the ranging device 400a and the ranging device 400b emit light parallel to each other and in opposite directions. Similarly, the ranging device 400c and the ranging device 400d emit light parallel to each other and in opposite directions. Thus, even when a plurality of customers 560 simultaneously take in and out the articles 540, the light is hardly blocked by the articles 540 or the like, and the detection accuracy is improved.

Further, since the ranging devices 400a and 400b (first sensor device) emit light in the first direction which is the z-axis direction, and the ranging devices 400c and 400d (second sensor device) emit light in the second direction which is the y-axis direction, the light emission directions are perpendicular to each other. Thus, the position where the customer 560 takes the article 540 in and out can be detected from two directions, and the detection accuracy is further improved.

For the article display shelf 501, it is more desirable to use the ranging device including the reflection surfaces of the first part R1 and the second part R2 described in the first to the sixth example embodiments, and in this case, the detection accuracy of taking in and out of the article 540 is further improved.

Ninth Example Embodiment

Next, as a ninth example embodiment of the present invention, a configuration example of an article display shelf which the arrangement of the ranging device is changed with respect to the seventh example embodiment will be described. The description of components common to the above-described example embodiments is omitted or simplified.

Figure 26:
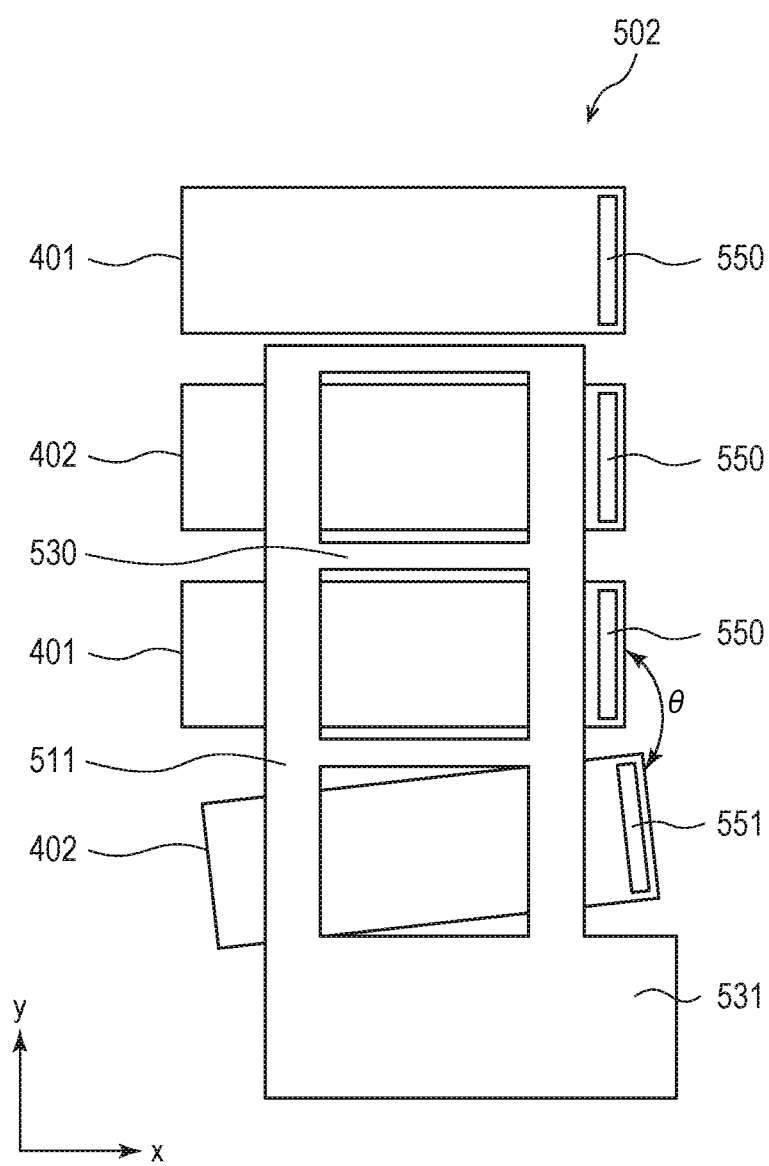
FIG. 26 is a schematic side view illustrating a structure of an article display shelf according to a ninth example embodiment.

FIG. 26 is a schematic side view of an article display shelf 502 according to the ninth example embodiment. In the article display shelf 502 of the present example embodiment, the shape of the shelf 511 and the arrangement of the second optical system 402 are different from those of the seventh example embodiment. In the shelf 511 of the present example embodiment, the lowermost shelf plate 531 protrudes toward the customer. In order to correspond with this, the second optical system 402 provided at the lowermost stage is provided at an angle θ with respect to the first optical system 401 at the upper stage. Thus, the detection region 551 formed by the second optical system 402 provided in the lowermost stage has an angle θ with respect to the detection region 550 formed by the first optical system 401 in the upper stage. Thus, the detection region can be arranged at a proper position even for shelves having different widths of the shelf boards for each stage. When the second optical system 402 is inclined, by rotating the second optical system 402 around the rotation axis u of the sensor unit 130 in the first optical system 401, the detection region can be inclined while maintaining the optical arrangement capable of parallel scan.

Note that, the range of the angle θ is set to be greater than 160 degrees and less than 180 degrees, for example. Since the first optical system 401 and the second optical system 402 are longitudinally elongated in the x direction, members may interfere with each other when the angle θ becomes 160 degrees or less.

For the article display shelf 502, it is more desirable to use the ranging device including the reflection surfaces of the first part R1 and the second part R2 described in the first to the sixth example embodiments, and in this case, the detection accuracy of taking in and out of the article 540 is further improved.

Tenth Example Embodiment

Next, as a tenth example embodiment of the present invention, a configuration example of an article display shelf including a ranging device 301 according to the sixth example embodiment will be described. The description of components common to the above-described example embodiments is omitted or simplified.

Figure 27:
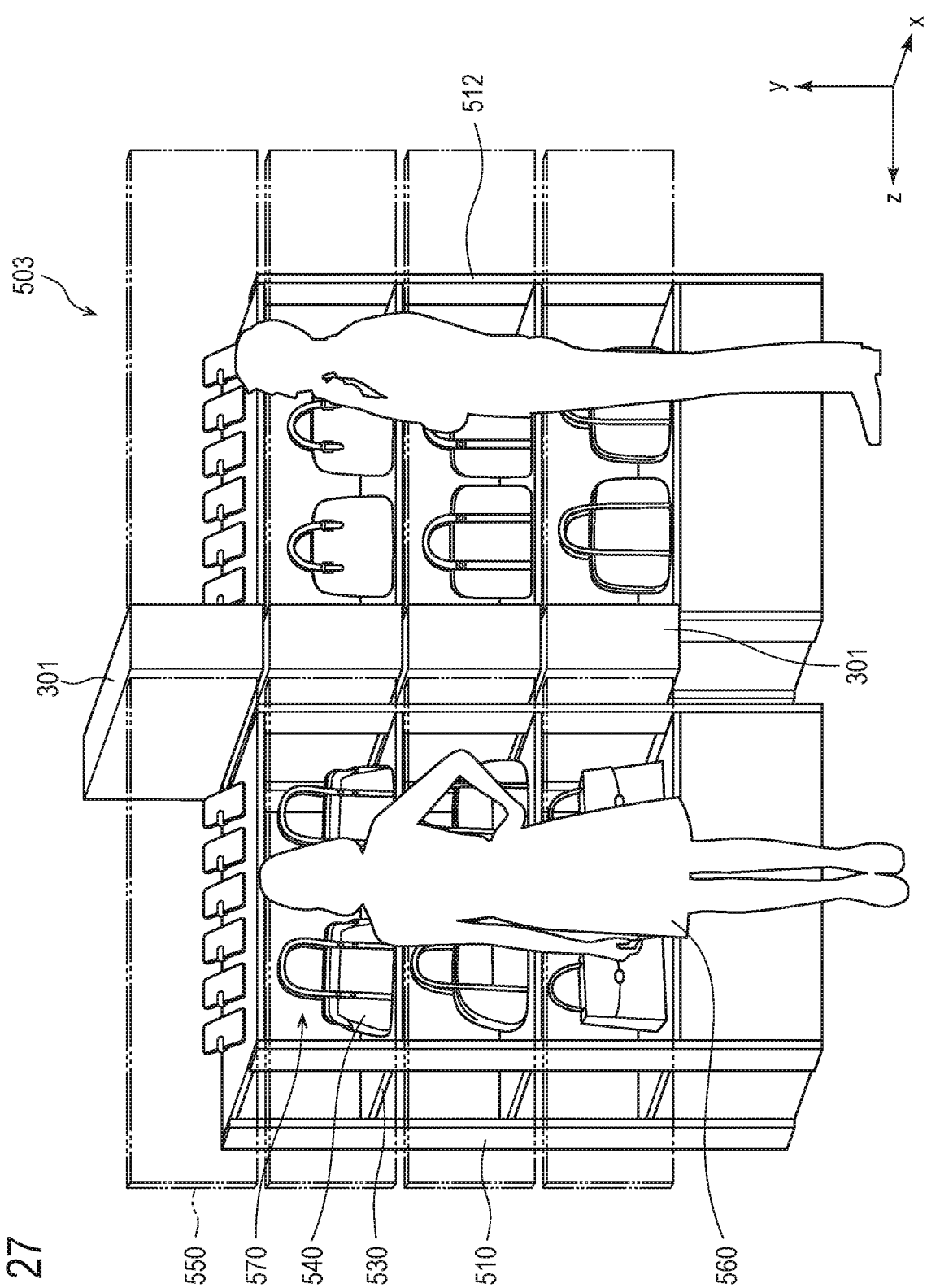
FIG. 27 is a schematic perspective view illustrating a structure of an article display shelf according to a tenth example embodiment.

FIG. 27 is a schematic perspective view of an article display shelf 503 according to a tenth example embodiment. The article display shelf 503 of the present example embodiment includes shelves 510 and 512, and two ranging devices 301. The two ranging devices 301 are arranged between the side surfaces of the shelf 510 and the side surfaces of the shelf 512. Since the ranging device 301 according to the sixth example embodiment can emit light in two directions to form a detection region, the ranging device 301 can detect both the left and right shelves 510 and 512 for taking in and out of the article 540. As a result, for example, the number of ranging devices can be reduced as compared with the case where the ranging devices 400 of the fifth example embodiment are installed. Note that, the ranging device used for the article display shelf 503 of the present example embodiment may be the ranging device 300 of the fourth example embodiment.

For the article display shelf 503, it is more desirable to use the ranging device including the reflection surfaces of the first part R1 and the second part R2 described in the fourth or the sixth example embodiments, and in this case, the detection accuracy of taking in and out of the article 540 is further improved.

The device described in the above example embodiments can be configured as in the following eleventh example embodiment.

Eleventh Example Embodiment

Figure 28:
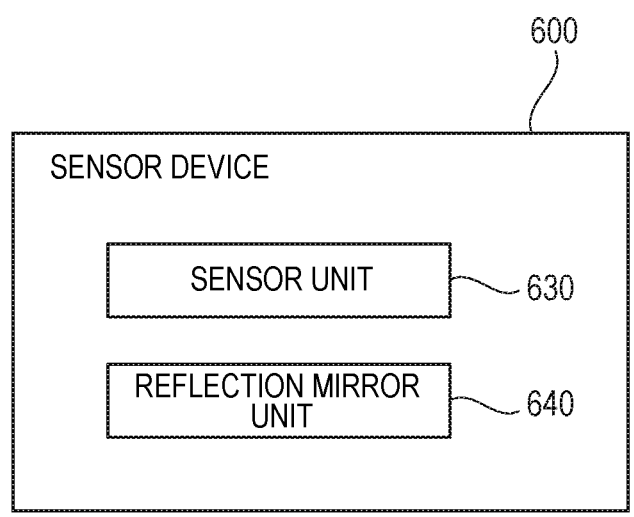
FIG. 28 is a block diagram of a sensor device according to an eleventh example embodiment.

FIG. 28 is a block diagram of a sensor device 600 according to an eleventh example embodiment. The sensor device 600 includes a sensor unit 630 and a reflection mirror unit 640. The sensor unit 630 emits light and receives the light reflected from the object. The reflection mirror unit 640 reflects light emitted from the sensor unit 630. The reflection surface of the reflection mirror included in the reflection mirror unit 640 includes a first part and a second part having a lower reflectance than the first part.

According to the present example embodiment, a sensor device 600 having improved detection accuracy is provided.

MODIFIED EXAMPLE EMBODIMENTS

Note that all of the example embodiments described above are mere embodied examples in implementing the present invention, and the technical scope of the present invention should not be construed in a limiting sense by these example embodiments. That is, the present invention can be implemented in various forms without departing from the technical concept or the primary feature thereof. For example, examples in which a part of the configuration of one example embodiment is added to another example embodiment, or examples in which a part of the configuration of another example embodiment is replaced are also example embodiments of the present invention.

The whole or part of the example embodiments disclosed above can be described as, but not limited to, the following supplementary notes.

(Supplementary Note 1)
A sensor device comprising:
a sensor unit that emits light and receives light reflected by an object; and
a reflection mirror unit that reflects light emitted from the sensor unit,
wherein a reflection surface of a reflection mirror included in the reflection mirror unit includes a first part and a second part having lower reflectance than the first part.

(Supplementary Note 2)
The sensor device according to supplementary note 1,
wherein the sensor unit or the reflection mirror unit is configured to perform a scan by changing an optical path of light,
wherein the first part is, within a range of the scan, a range in which light emitted from the sensor unit is incident, and
wherein the second part is, within a range of the scan, a range in which light emitted from the sensor unit is not incident.

(Supplementary Note 3)
The sensor device according to supplementary note 1 or 2, wherein the second part is arranged surrounding the first part.

(Supplementary Note 4)
The sensor device according to any one of supplementary notes 1 to 3,
wherein the first part and the second part are made of a same base member, and
wherein the base member at the second part has a surface treated to reduce reflectance.

(Supplementary Note 5)
The sensor device according to supplementary note 4, wherein a surface of the base member at the second part is covered with a light absorbing material.

(Supplementary Note 6)
The sensor device according to supplementary note 4, wherein surface roughness of the base member at the second part is greater than that of the base member at the first part.

(Supplementary Note 7)
The sensor device according to any one of supplementary notes 1 to 3,
wherein the first part and the second part are made of different base members, and
wherein reflectance of a base member of the second part is less than that of a base member of the first part.

(Supplementary Note 8)
The sensor device according to any one of supplementary notes 1 to 7,
wherein the reflection mirror unit includes a plurality of the reflection mirrors, and
wherein each reflection surface of the plurality of the reflection mirrors includes the first part and the second part.

(Supplementary Note 9)
The sensor device according to any one of supplementary notes 1 to 8, wherein the sensor unit is a Light Detection and Ranging (LiDAR) device that acquires distance information based on light reflected by the object.

(Supplementary Note 10)
An article display shelf comprising:
the sensor device according to any one of supplementary notes 1 to 9; and
a display portion on which an article is displayed.

This application is based upon and claims the benefit of priority from Japanese Patent Application No. 2018-202825, filed on Oct. 29, 2018, the disclosure of which is incorporated herein in its entirety by reference.

REFERENCE SIGNS LIST 10 object
100-102, 300-301, 400, 400a-400d ranging device
110 base body
120 lid body
130 sensor unit
140, 340, 440 parabolic reflection mirror
140a-140c, 160a, 340a-340b, 361a, 362a, 440a reflection surface
150 position adjustment mechanism
151-152, 351 drive mechanism
160-162, 362-365, 460 plane reflection mirror
170 mounting portion
200 control device
210 interface
220 control unit
230 signal processing unit
240 storage unit
361 logarithmic spiral reflection mirror
401 first optical system
402 second optical system
500-503 article display shelf
510-512 shelf
520-521 display portion
530-531 display plate
540 article
550-551 detection region
560 customer
570-571 opening portion
600 sensor device
630 sensor unit
640 reflection mirror unit
R1 first part
R2 second part

What is claimed is:
1. A sensor device comprising:
a sensor unit that emits light and receives light reflected by an object; and
a reflection mirror unit that reflects light emitted from the sensor unit toward the object and reflects light reflected from the object toward the sensor unit,
wherein the reflection mirror unit includes a plurality of reflection mirrors each configured to reflect light emitted from the sensor unit and light reflected from the object on a same reflection surface, and
wherein each of the plurality of reflection mirrors includes, on the same reflection surface, a first part and a second part having lower reflectance than the first part, the second part being arranged such that the second part surrounds the first part.

2. The sensor device according to claim 1,
wherein the sensor unit or the reflection mirror unit is configured to perform a scan by changing an optical path of light, wherein the first part is, within a range of the scan, a range in which light emitted from the sensor unit is incident, and wherein the second part is, within the range of the scan, a range in which light emitted from the sensor unit is not incident.

3. The sensor device according to claim 1, wherein the first part and the second part are made of a same base member, and wherein the base member at the second part has a surface treated to reduce reflectance.

4. The sensor device according to claim 3, wherein a surface of the base member at the second part is covered with a light absorbing material.

5. The sensor device according to claim 3, wherein surface roughness of the base member at the second part is greater than that of the base member at the first part.

6. The sensor device according to claim 1, wherein the first part and the second part are made of different base members, and wherein reflectance of the base member of the second part is less than that of the base member of the first part.

7. The sensor device according to claim 1, wherein the sensor unit is a Light Detection and Ranging (LiDAR) device that acquires distance information based on light reflected by the object.

8. An article display shelf comprising:

the sensor device according to claim 1; and a display portion on which an article is displayed.

* * * * *